Aug. 17, 1954

W. L. SHAFER, JR 2,686,843

CALL DISTRIBUTING SERVICE DESK

Filed April 26, 1951

24 Sheets-Sheet 1

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 2

INVENTOR
W. L. SHAFER, JR.
BY C. Mattice
ATTORNEY

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951 24 Sheets-Sheet 4

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 5

INVENTOR
BY W. L. SHAFER, JR.
C. Mattice
ATTORNEY

INVENTOR
W. L. SHAFER, JR.
BY C. Mattice
ATTORNEY

INVENTOR
W. L. SHAFER, JR.
BY C. Mattice
ATTORNEY

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 9

INVENTOR
W. L. SHAFER, JR.
BY C. Mattice
ATTORNEY

INVENTOR
W. L. SHAFER, JR.
BY C. Mathie
ATTORNEY

Aug. 17, 1954

W. L. SHAFER, JR 2,686,843

CALL DISTRIBUTING SERVICE DESK

Filed April 26, 1951

24 Sheets-Sheet 11

INVENTOR
W. L. SHAFER, JR.
BY C. Mattici
ATTORNEY

INVENTOR
W. L. SHAFER, JR.
BY C. Mattice
ATTORNEY

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 14

INVENTOR
W. L. SHAFER, JR.
BY C. Mathie
ATTORNEY

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 16

INVENTOR
W. L. SHAFER, JR.
BY C. Mathie
ATTORNEY

Aug. 17, 1954
W. L. SHAFER, JR
2,686,843
CALL DISTRIBUTING SERVICE DESK
Filed April 26, 1951
24 Sheets-Sheet 17

INVENTOR
W. L. SHAFER, JR.
BY C. Mattice
ATTORNEY

INVENTOR
W. L. SHAFER, JR.
BY C. Mattice
ATTORNEY

Aug. 17, 1954

W. L. SHAFER, JR 2,686,843

CALL DISTRIBUTING SERVICE DESK

Filed April 26, 1951

24 Sheets-Sheet 19

INVENTOR
W. L. SHAFER, JR.
BY C. Mattice
ATTORNEY

INVENTOR
W. L. SHAFER, JR.
BY C. Mattice
ATTORNEY

Aug. 17, 1954

W. L. SHAFER, JR 2,686,843

CALL DISTRIBUTING SERVICE DESK

Filed April 26, 1951

24 Sheets-Sheet 21

INVENTOR
W. L. SHAFER, JR.
BY C. Mattie
ATTORNEY

INVENTOR
W. L. SHAFER, JR.
BY C. Mathie
ATTORNEY

INVENTOR
W. L. SHAFER, JR.
BY C. Mattice
ATTORNEY

Aug. 17, 1954 W. L. SHAFER, JR 2,686,843

CALL DISTRIBUTING SERVICE DESK

Filed April 26, 1951

24 Sheets-Sheet 24

INVENTOR
W. L. SHAFER, JR
BY C. Mattice
ATTORNEY

Patented Aug. 17, 1954

2,686,843

UNITED STATES PATENT OFFICE 2,686,843

CALL DISTRIBUTING SERVICE DESK

William L. Shafer, Jr., Orange, N. J., assignor to Bell Telephone Laboratories, Incorporated, New York, N. Y., a corporation of New York Application April 26, 1951, Serial No. 222,961

15 Claims. (Cl. 179—27)

This invention relates to telephone systems and more particularly to the distribution of calls to operators at a service desk.

The distribution of calls, all of which are of one type, to a plurality of operators is well known. However, the distribution of calls of a plurality of types to a plurality of positions equipped to serve different combinations of call types presents a more complex problem.

In accordance with the present invention, each of a plurality of types of calls are assigned to a definite order of preference in which the calls are to be handled, and the operators' positions are wired to make them available for handling only certain predetermined types of calls. Alternate calls of one type are directed to the highest and lowest numbered positions assigned to that type and if a number of calls of one type are waiting at the same time, the calls on the highest numbered trunk and on the lowest numbered trunk are handled alternately until all of the simultaneous calls have been taken care of.

More specifically a trunk is connected to an operator's position by means of a cross-bar switch in which there is a select magnet individual to each pair of trunks and a hold magnet individual to each operator's position.

Means is provided for transferring calls from an operator's position to a service assistant's position, including means for reoperating the select magnet of the trunk under the control of the operator's position, operating the hold magnet individual to the service assistant's position and then releasing the hold magnet individual to the operator's position.

The call distribution is controlled by a common switching circuit including a preference circuit for each type of call, only one of which can function at a time. Common to the preference circuits is a timing circuit which times each preference circuit operation. If the timing circuit times out during the operation of one preference circuit, the common circuit registers the failure but permits call distribution to proceed. If two successive calls cause the timing circuit to time out, the preference circuit causing the two failures is locked out.

These and other features of the invention will be more clearly understood from a consideration of the following description in connection with the drawings, in which.

Figure 3:
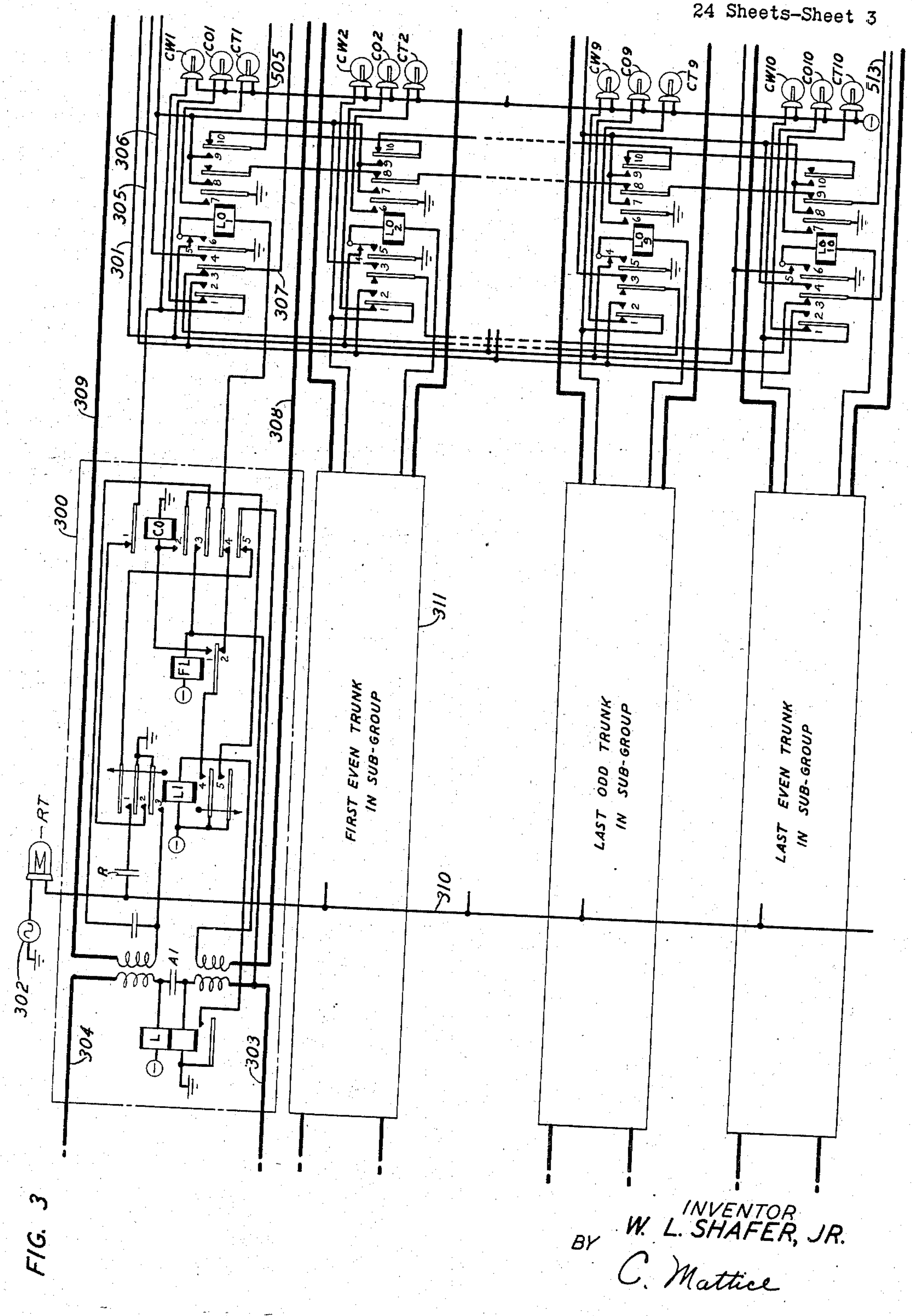
Figs. 3 to 23 show the circuits in detail.
Figure 4:
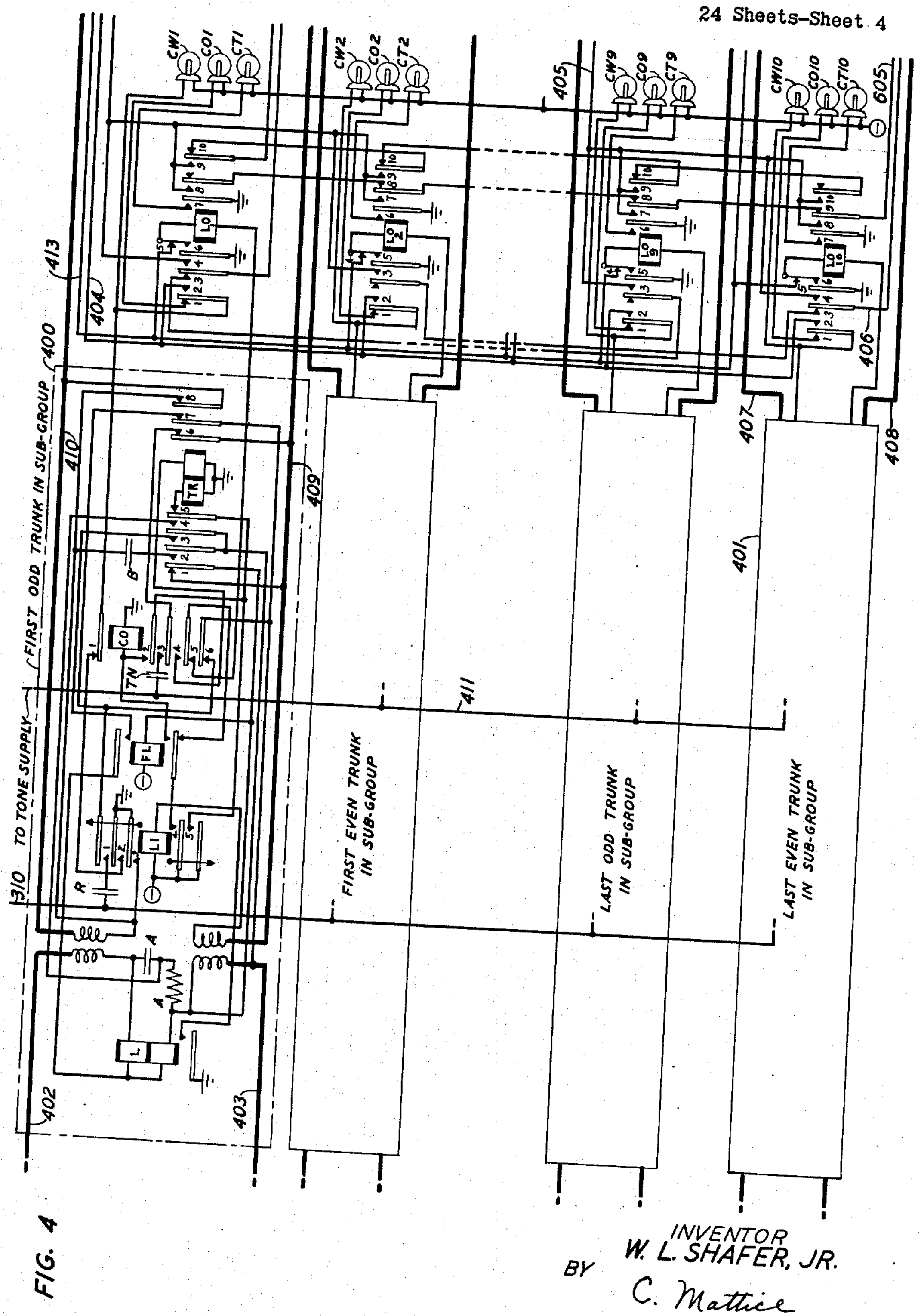
Figure 5:
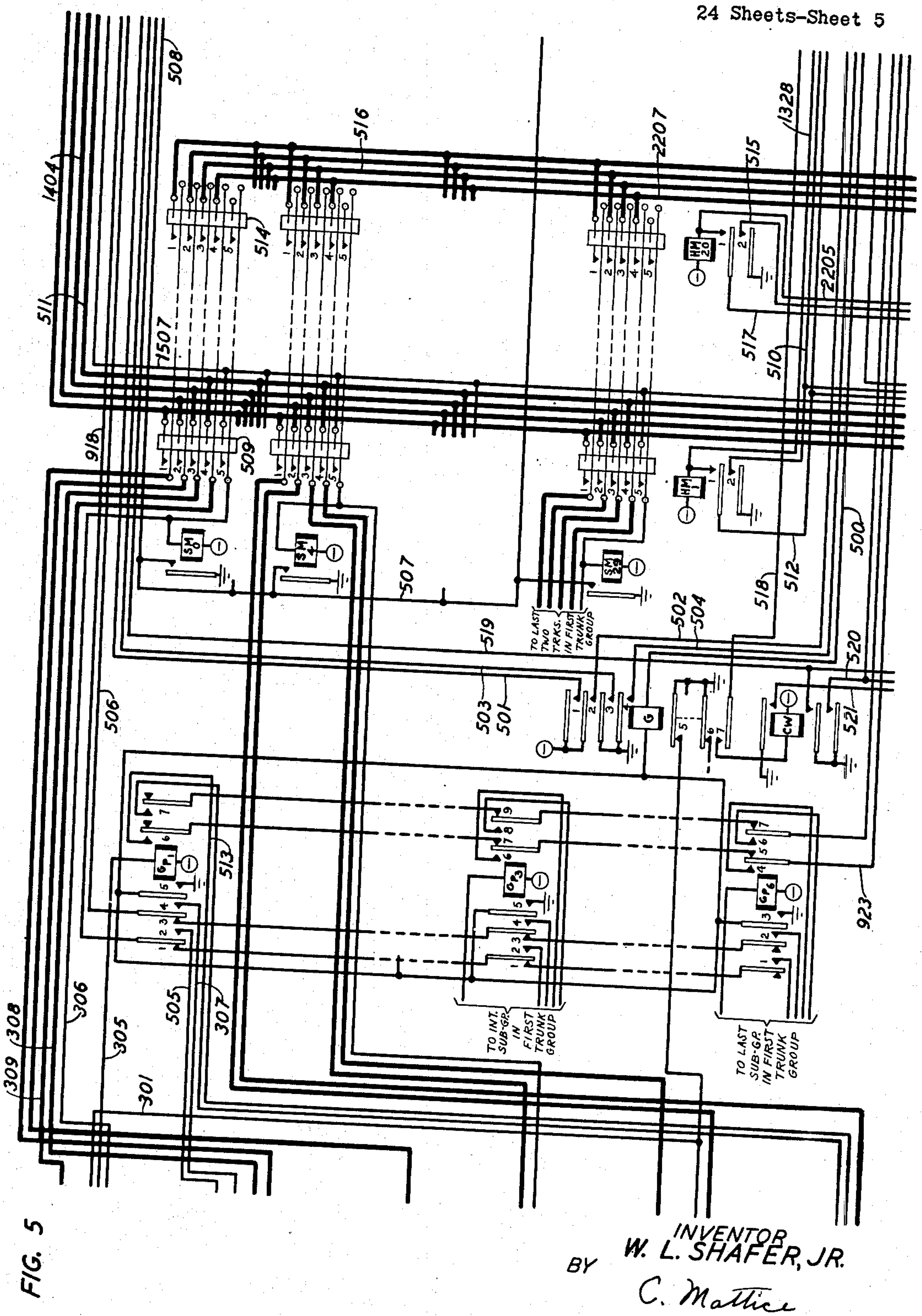
Figure 6:
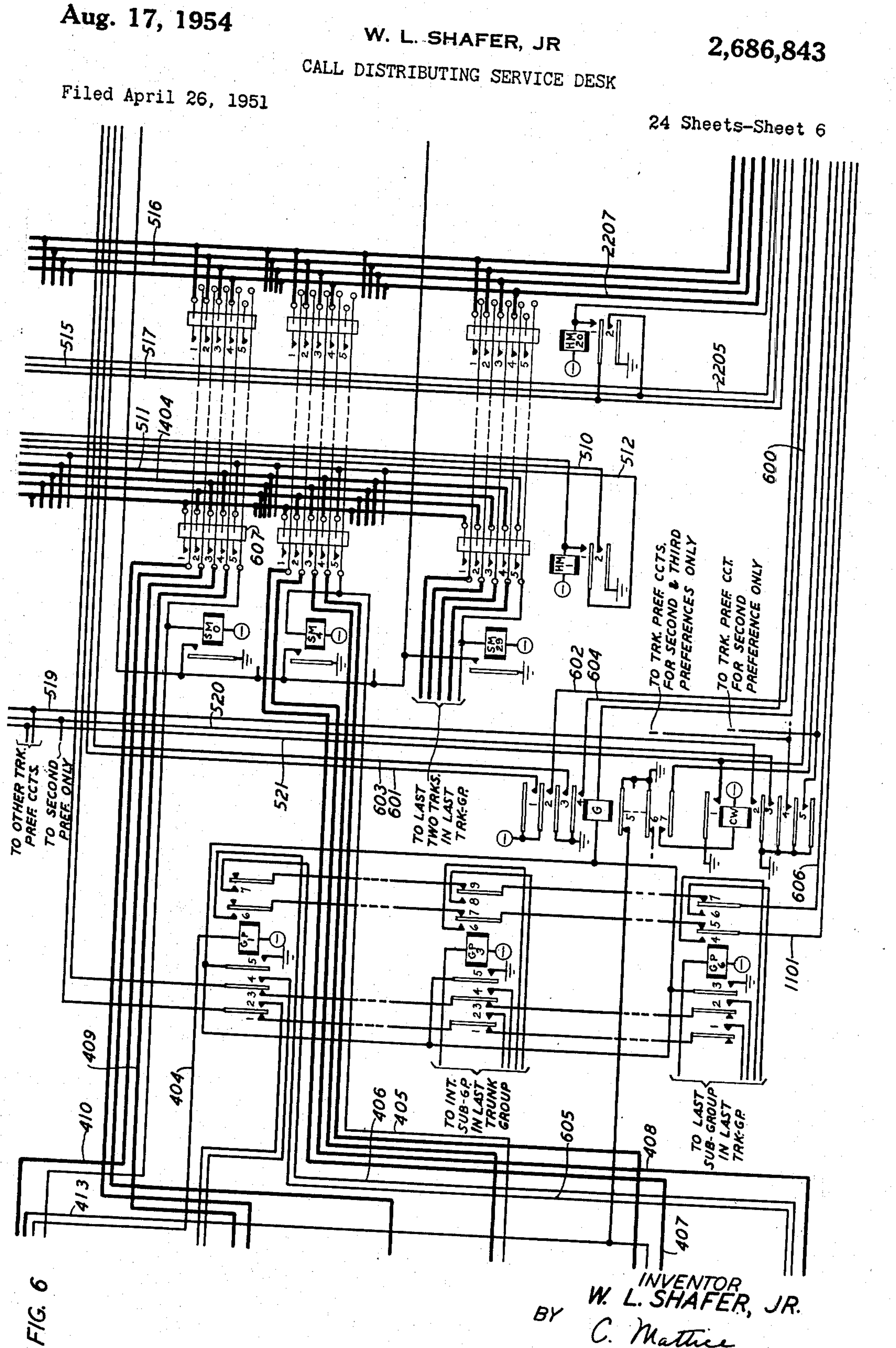
Figure 7:
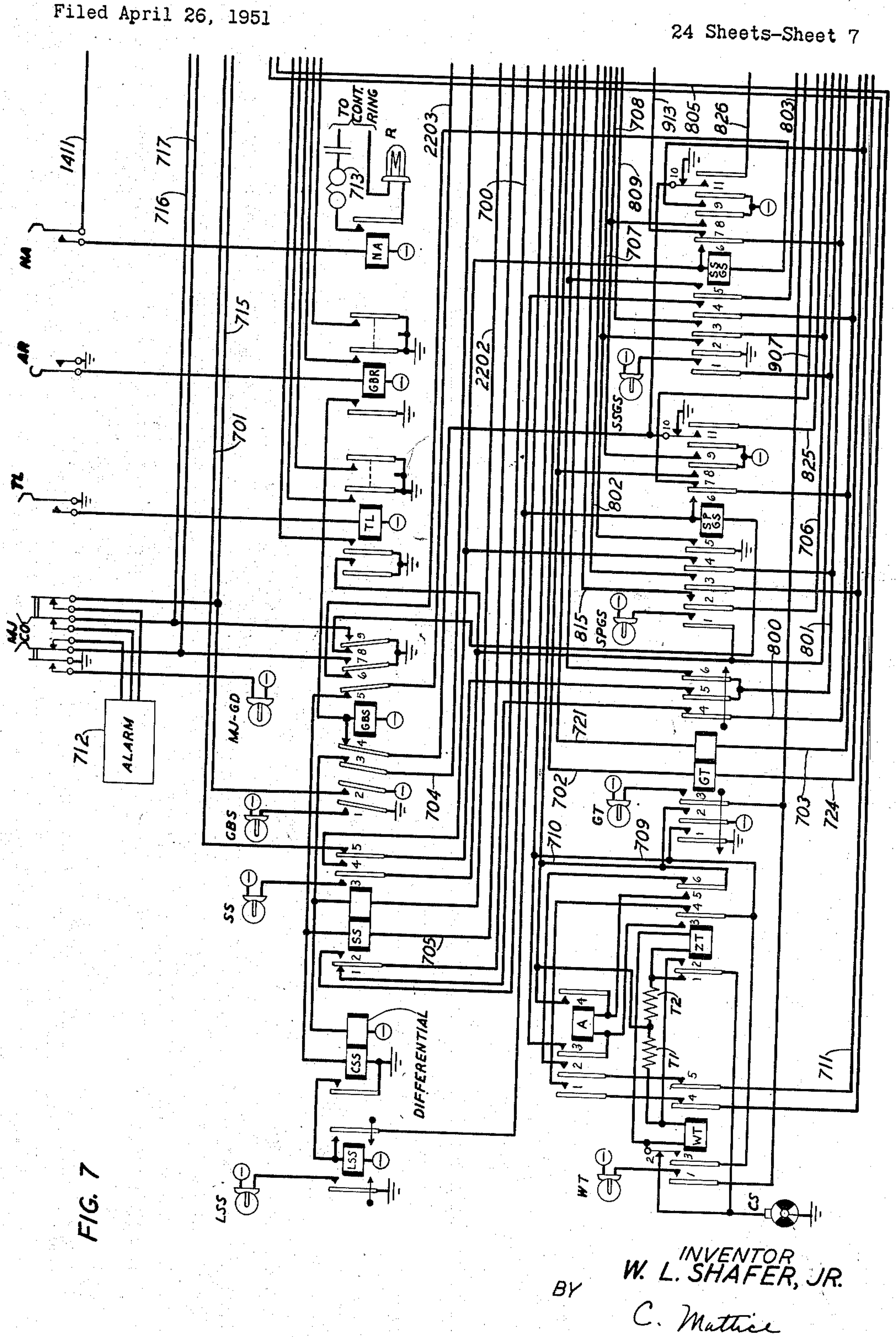
Figure 8:
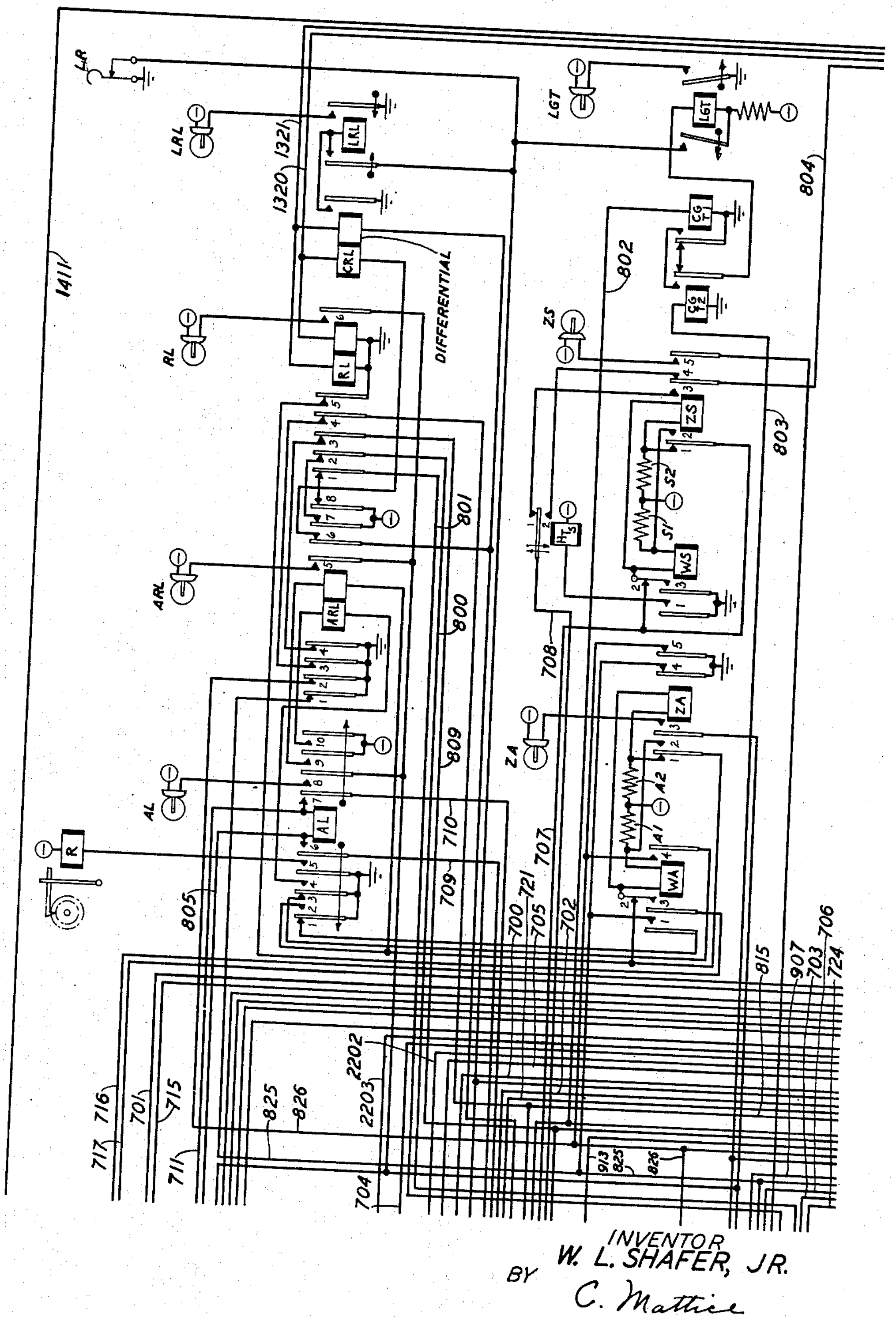
Figure 9:
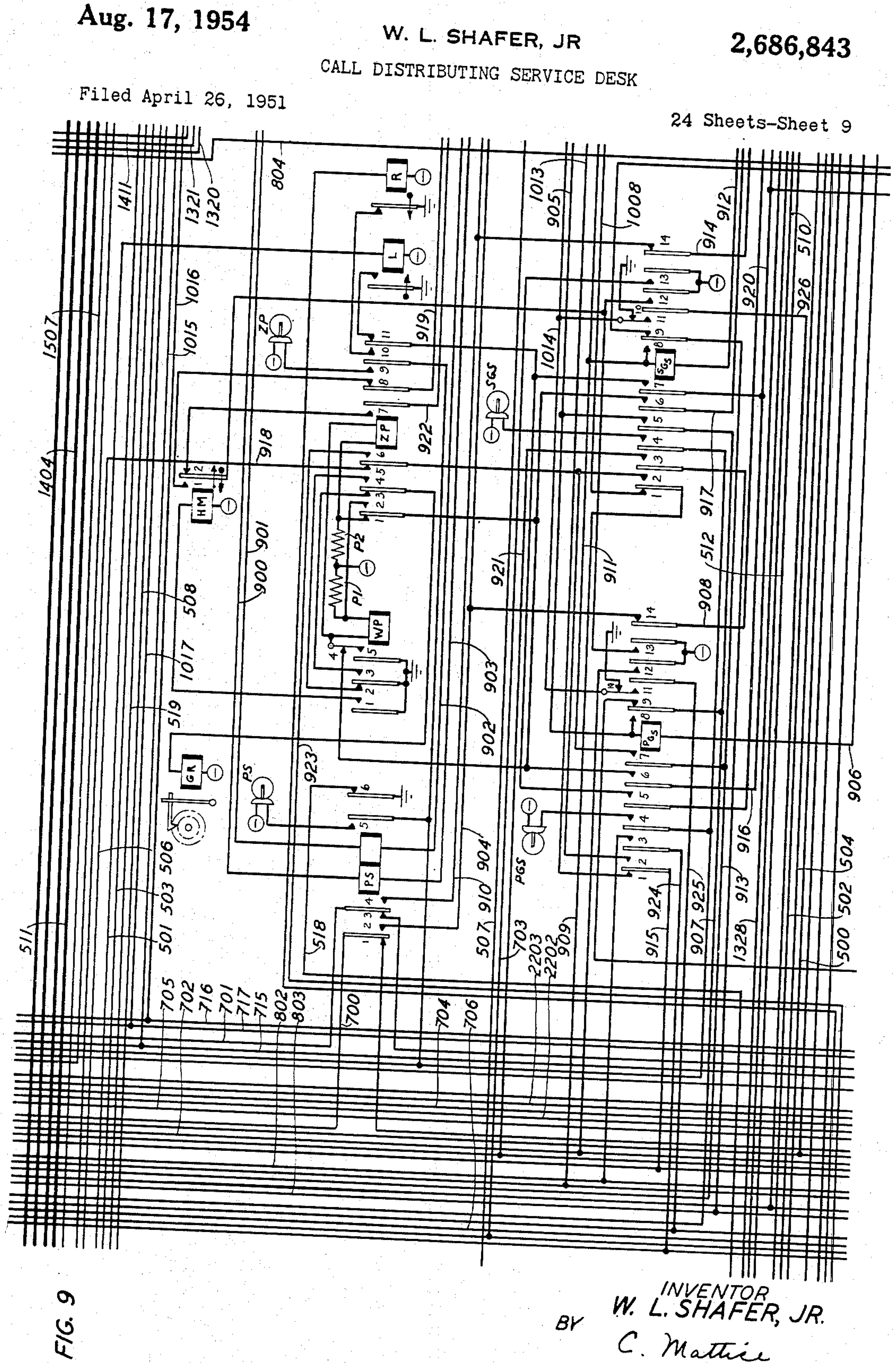
Figure 10:
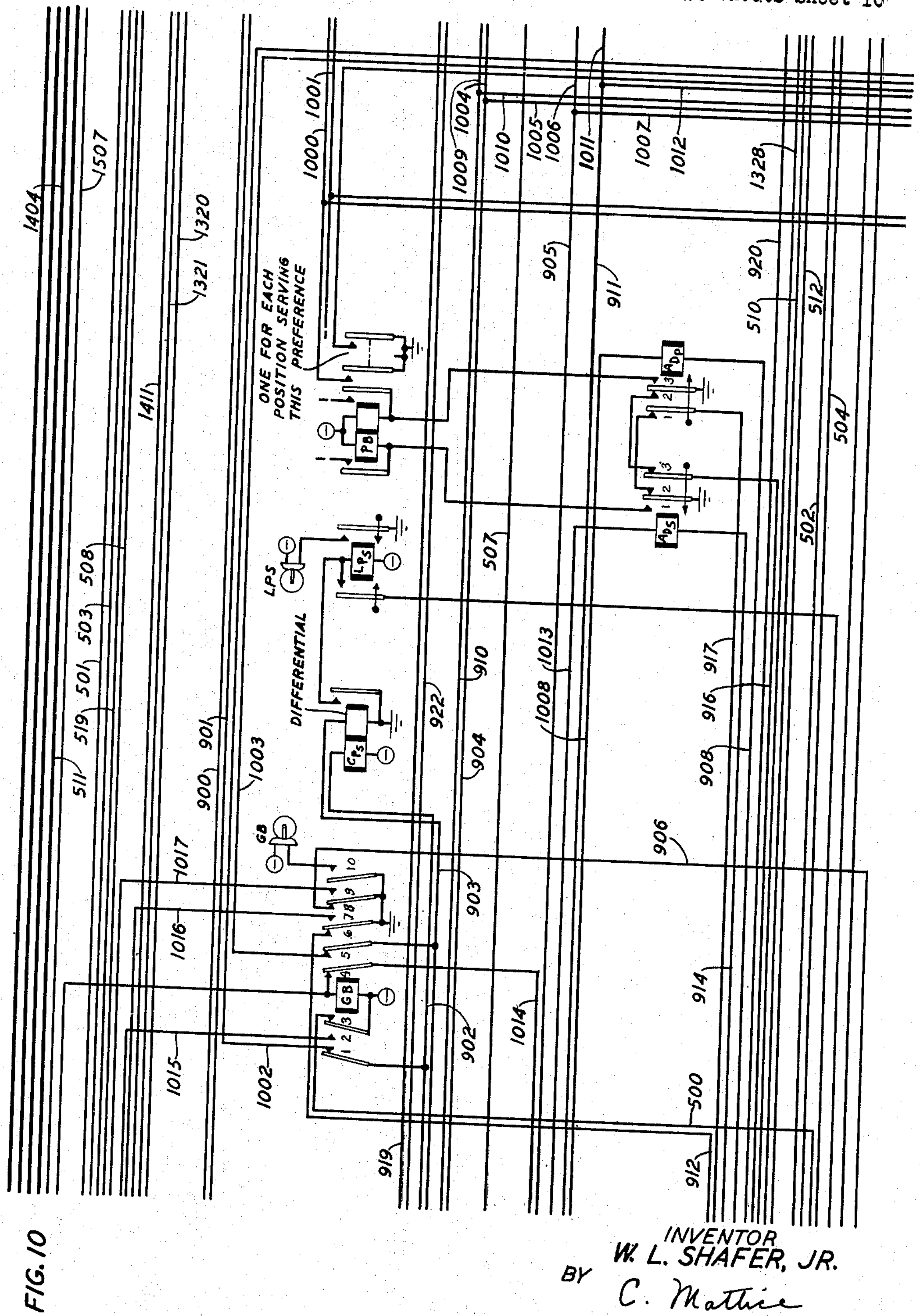
Figure 11:
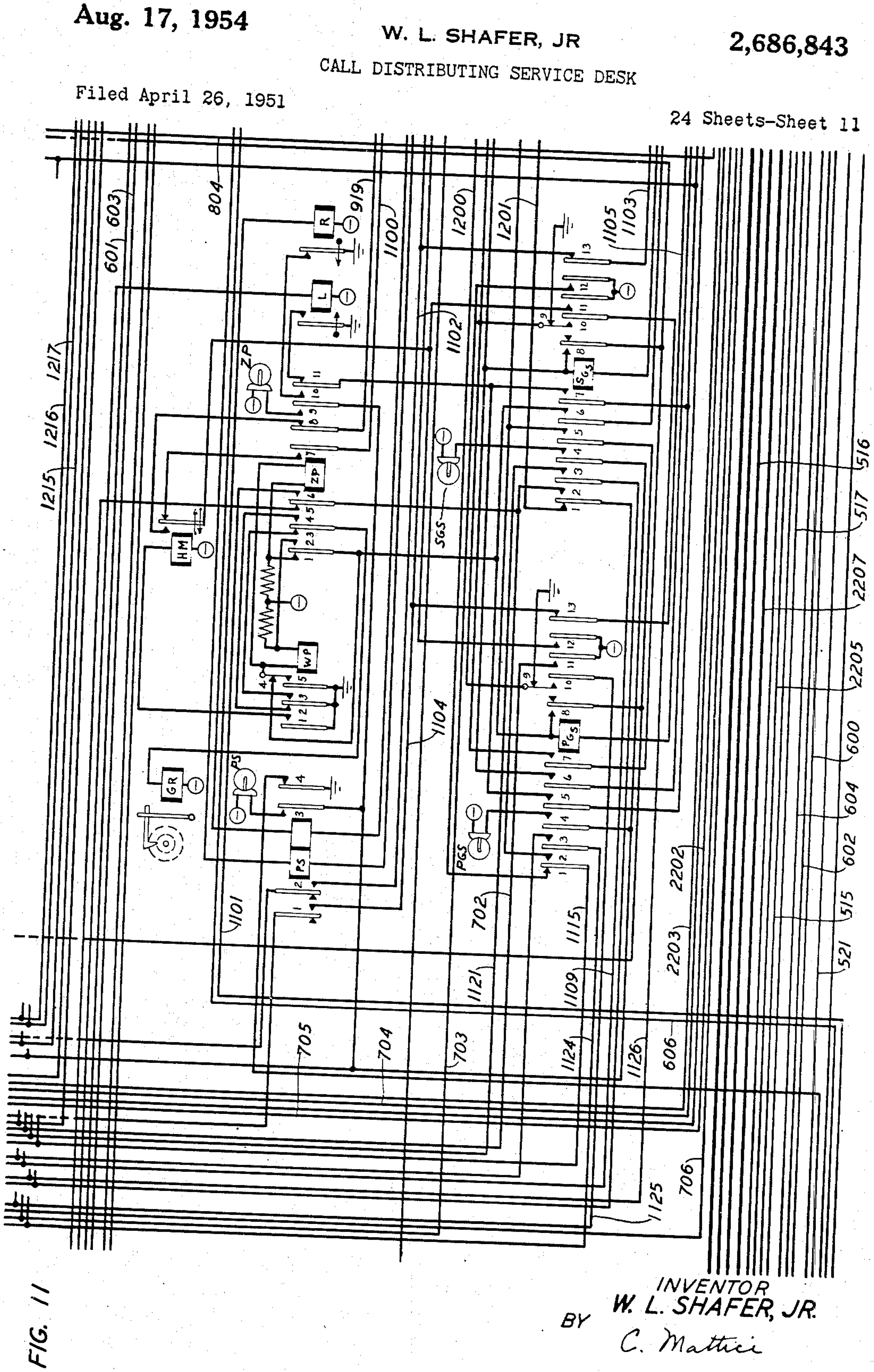
Figure 12:
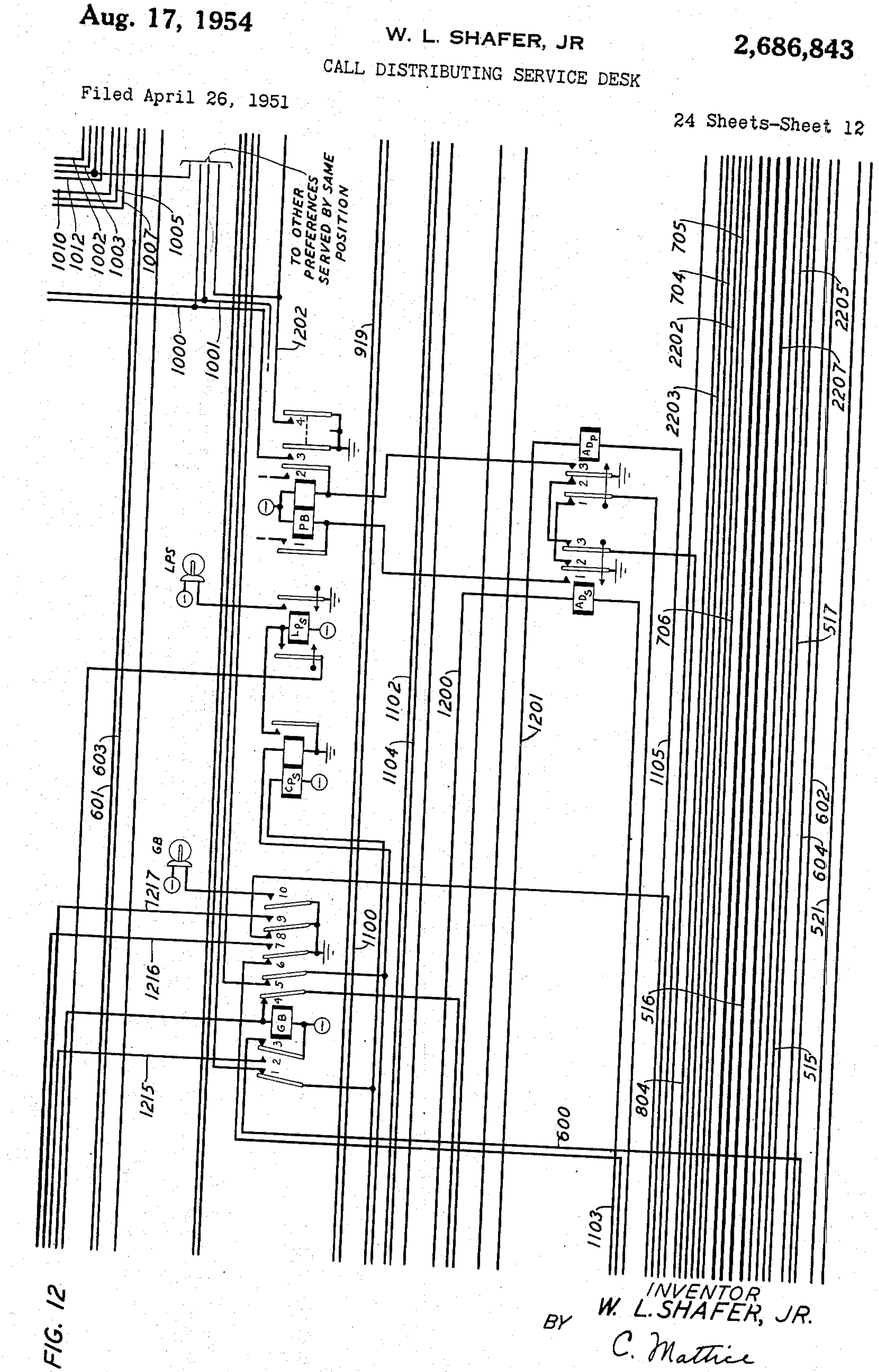
Figure 13:
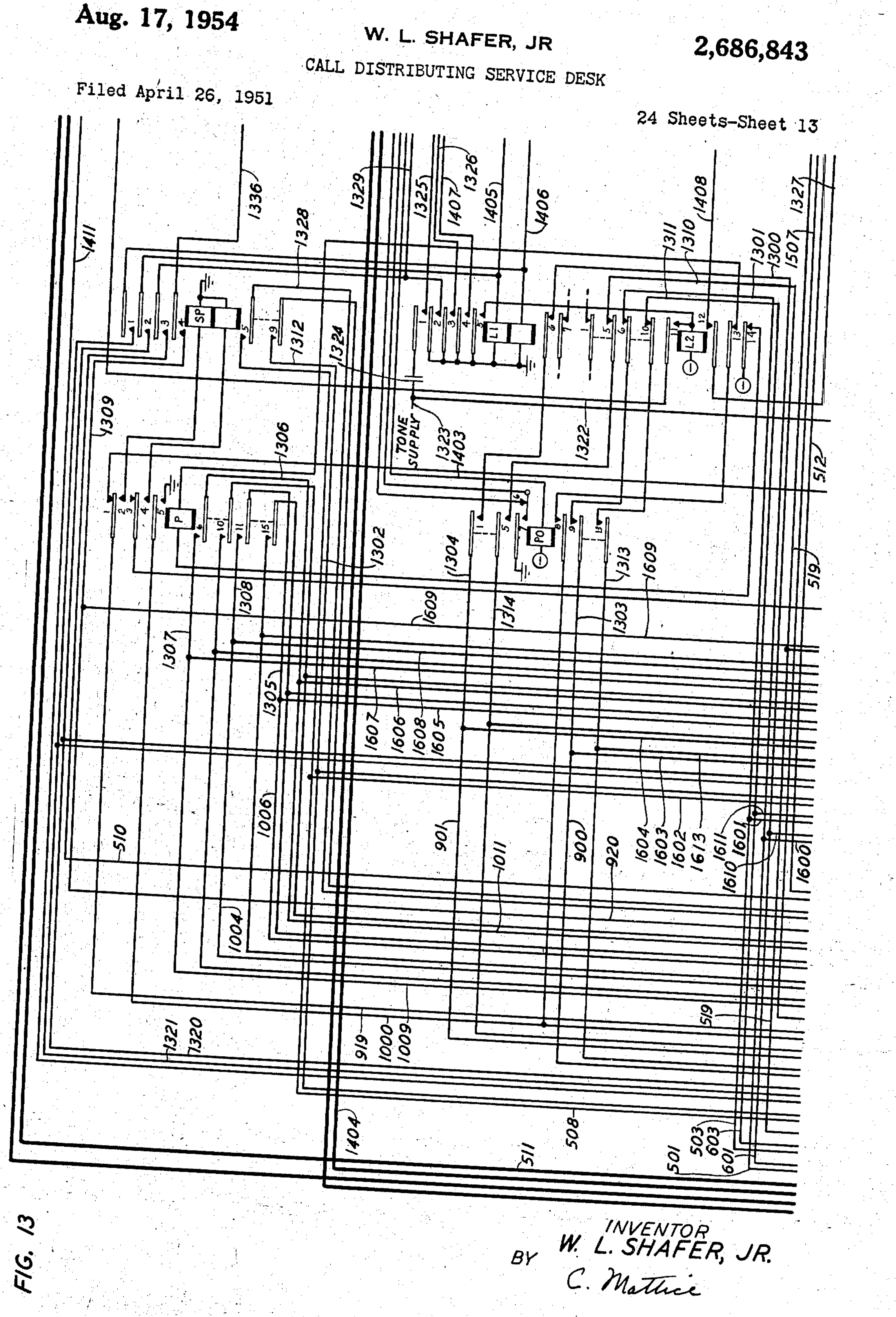
Figure 14:
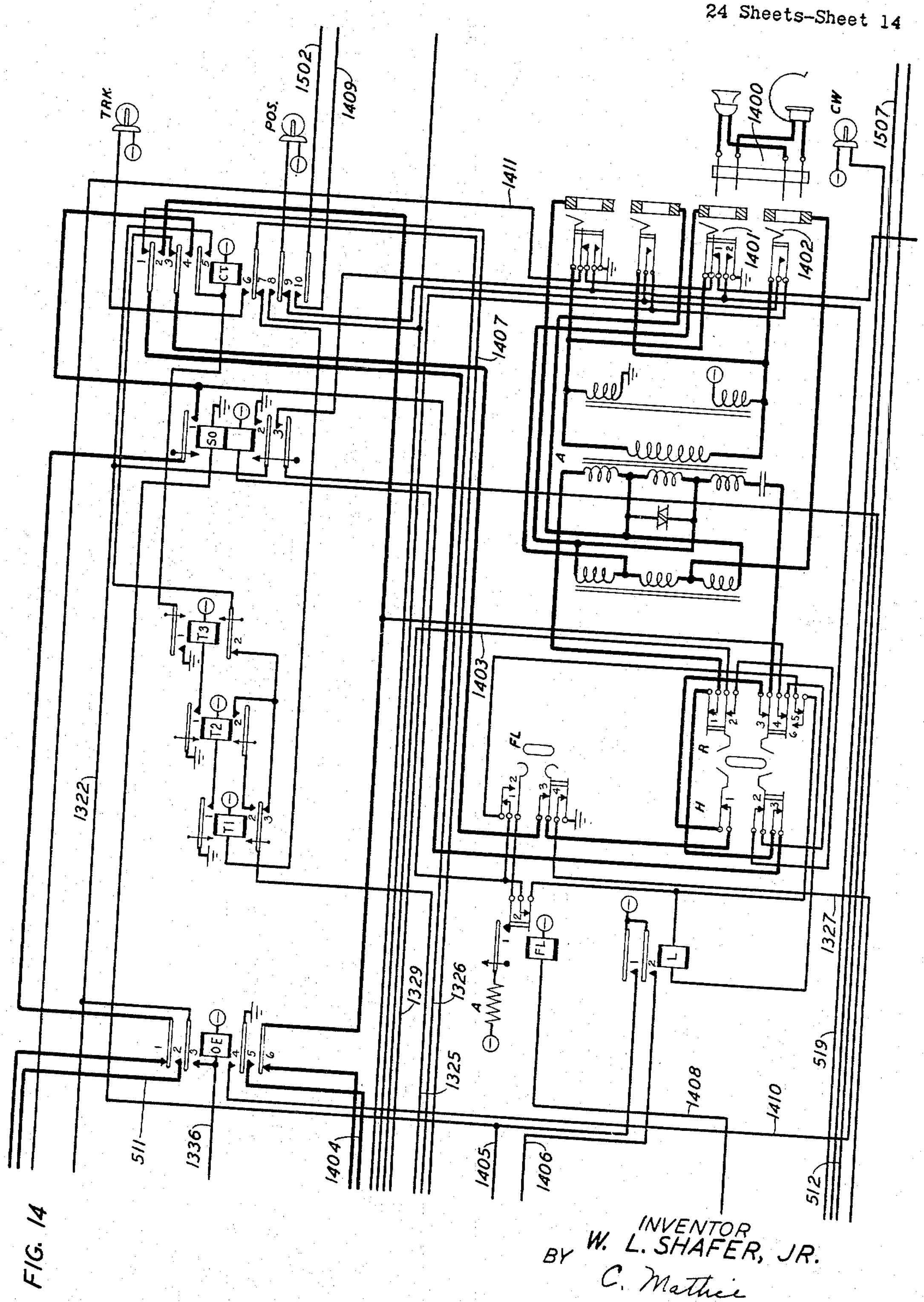
Figure 15:
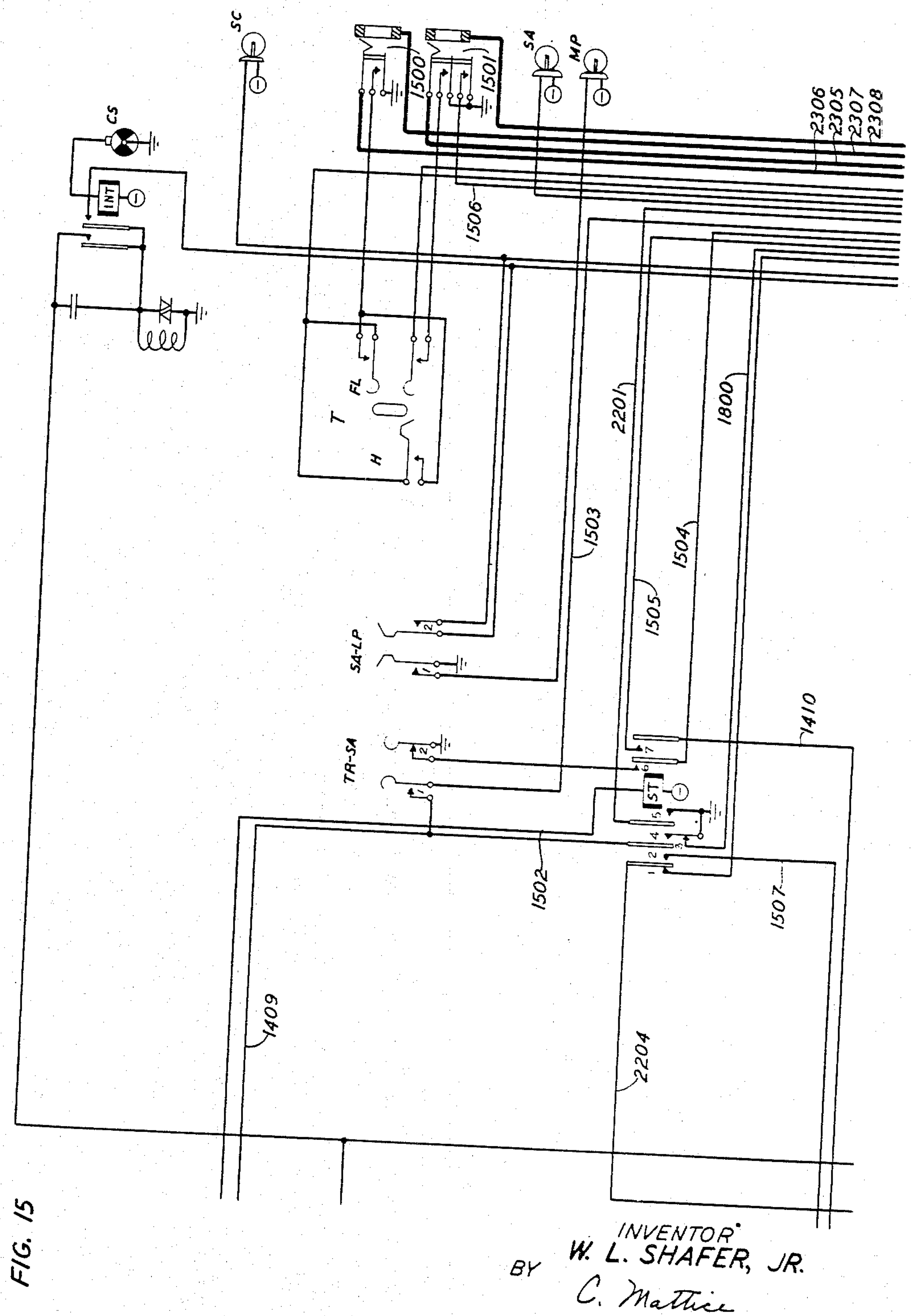
Figure 16:
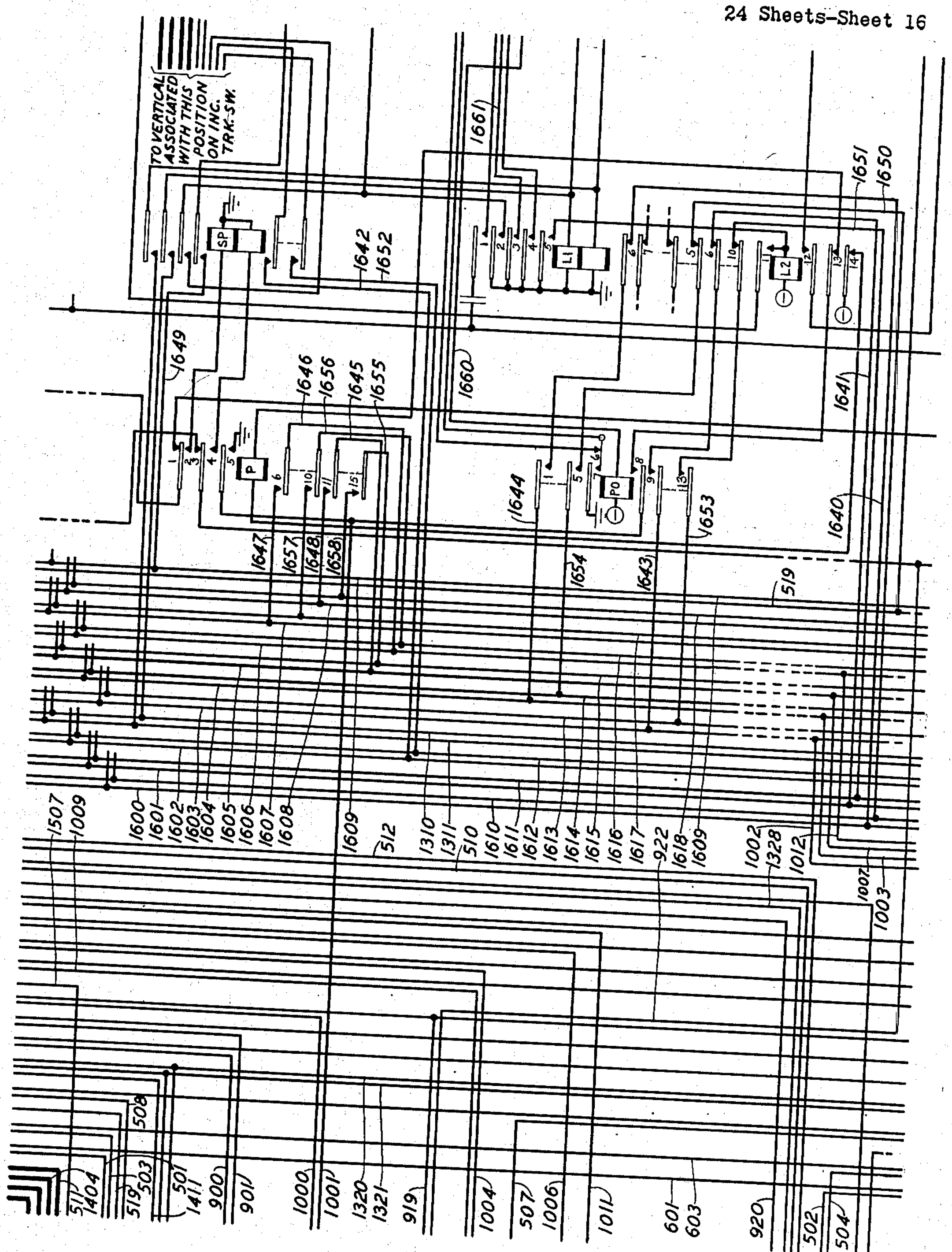
Figure 17:
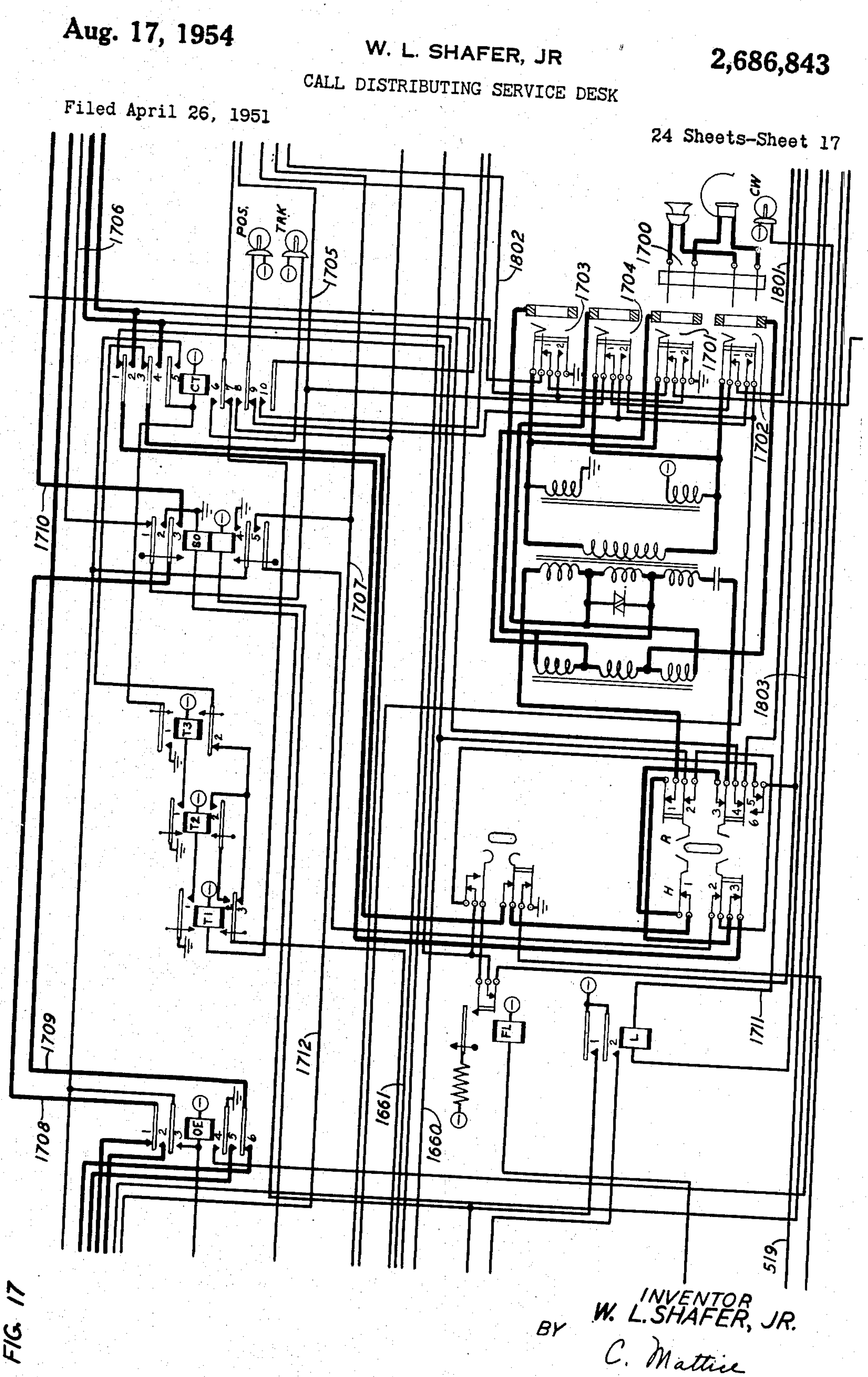
Figure 18:
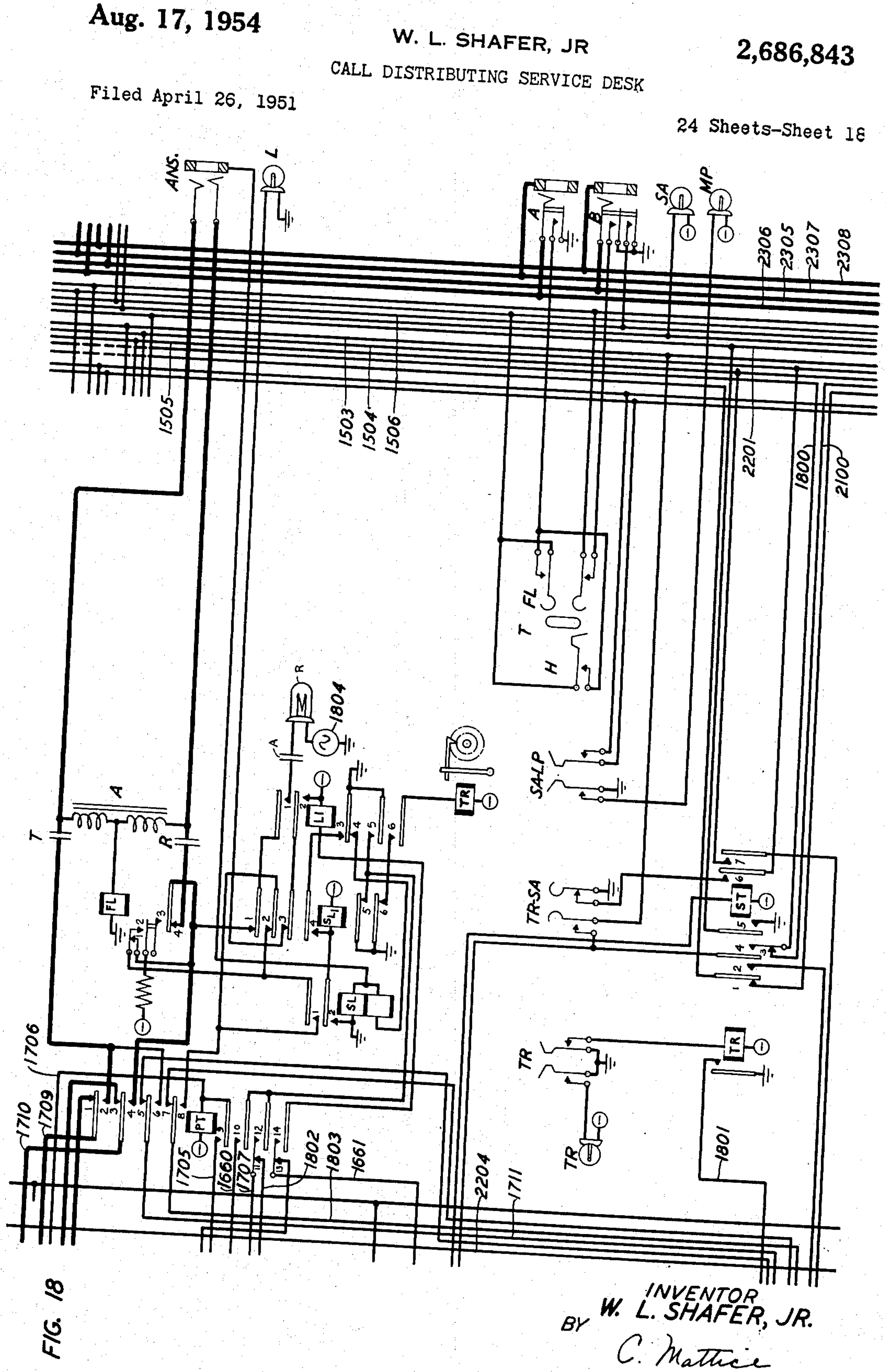
Figure 19:
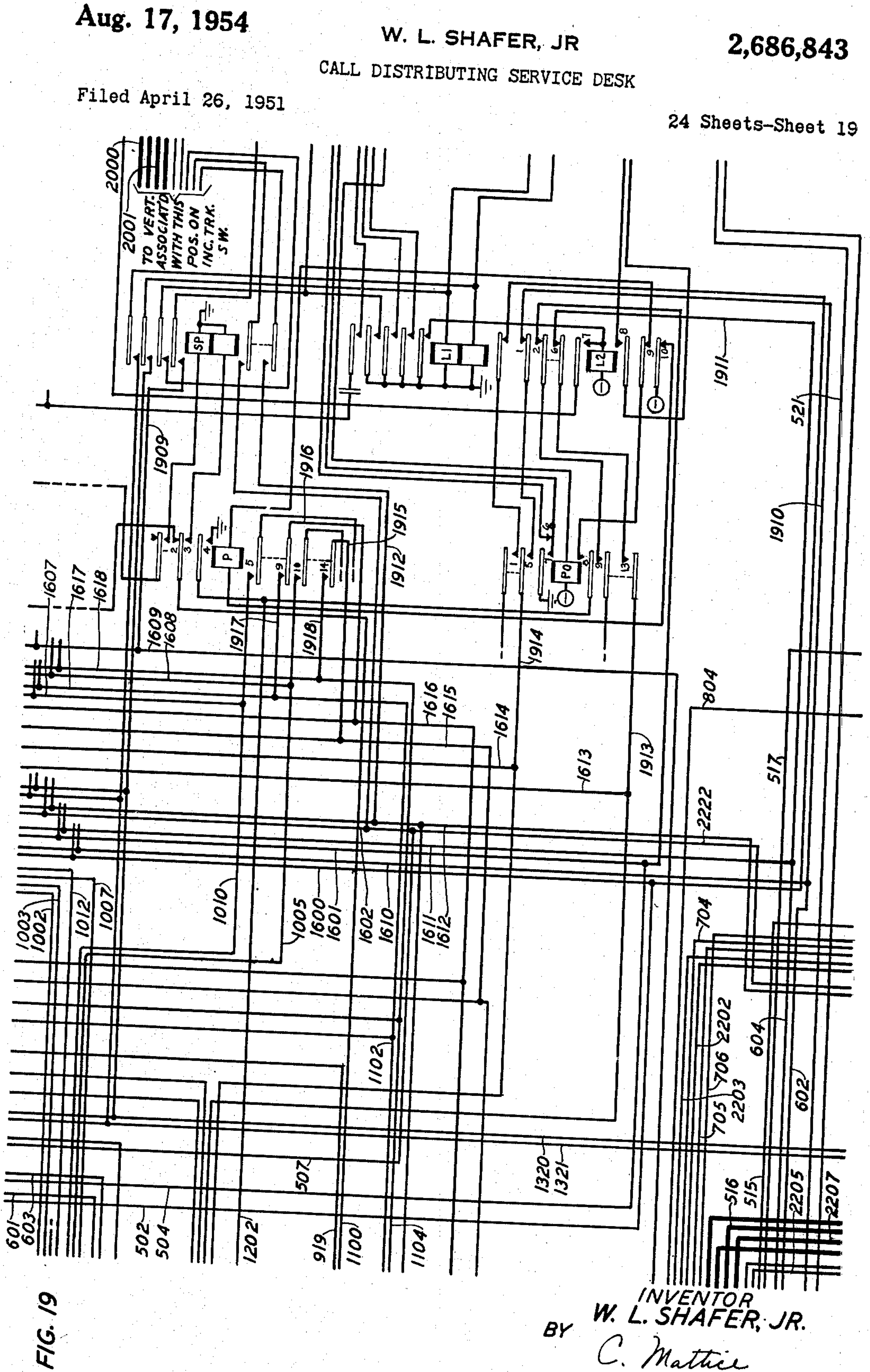
Figure 20:
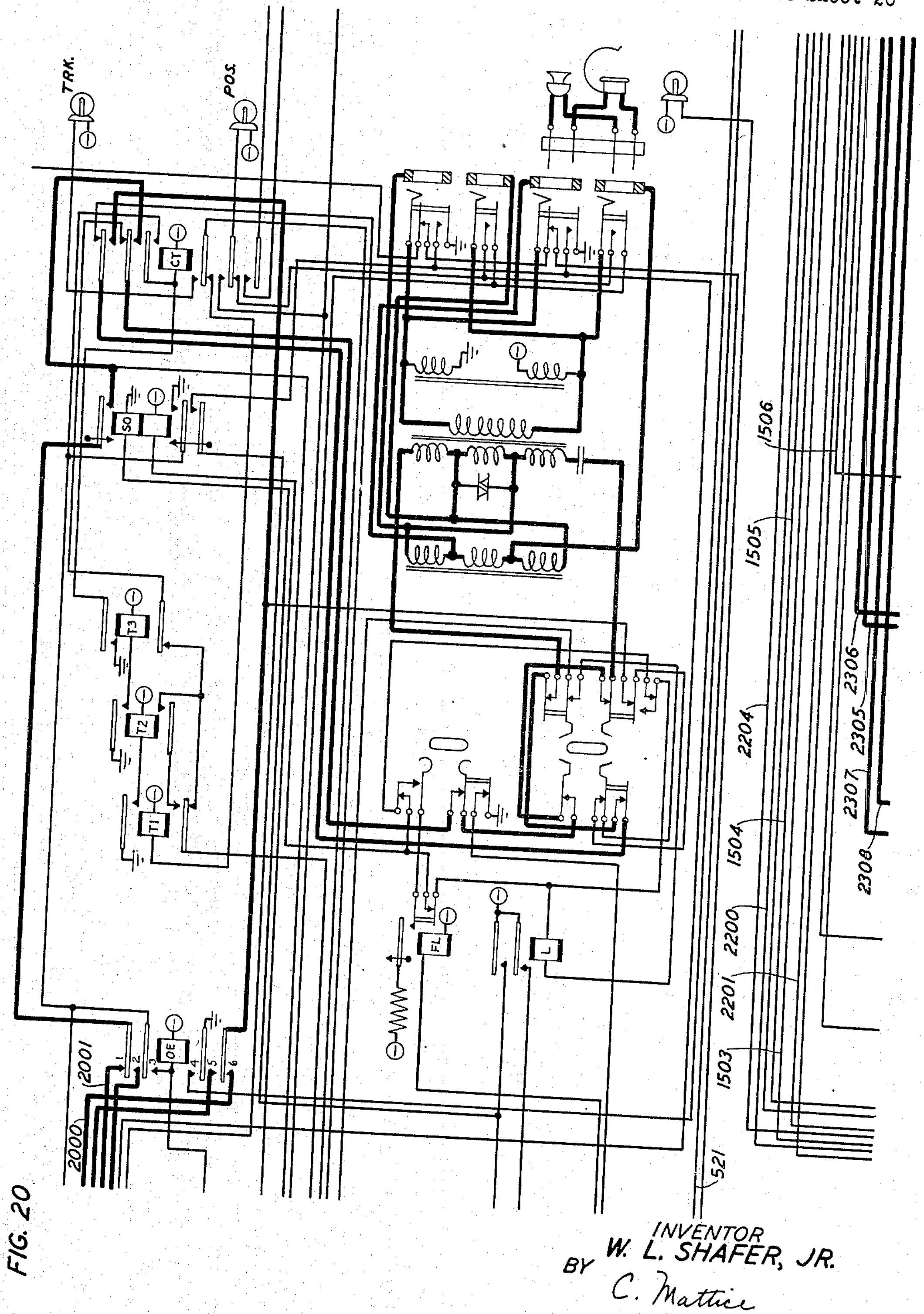
Figure 21:
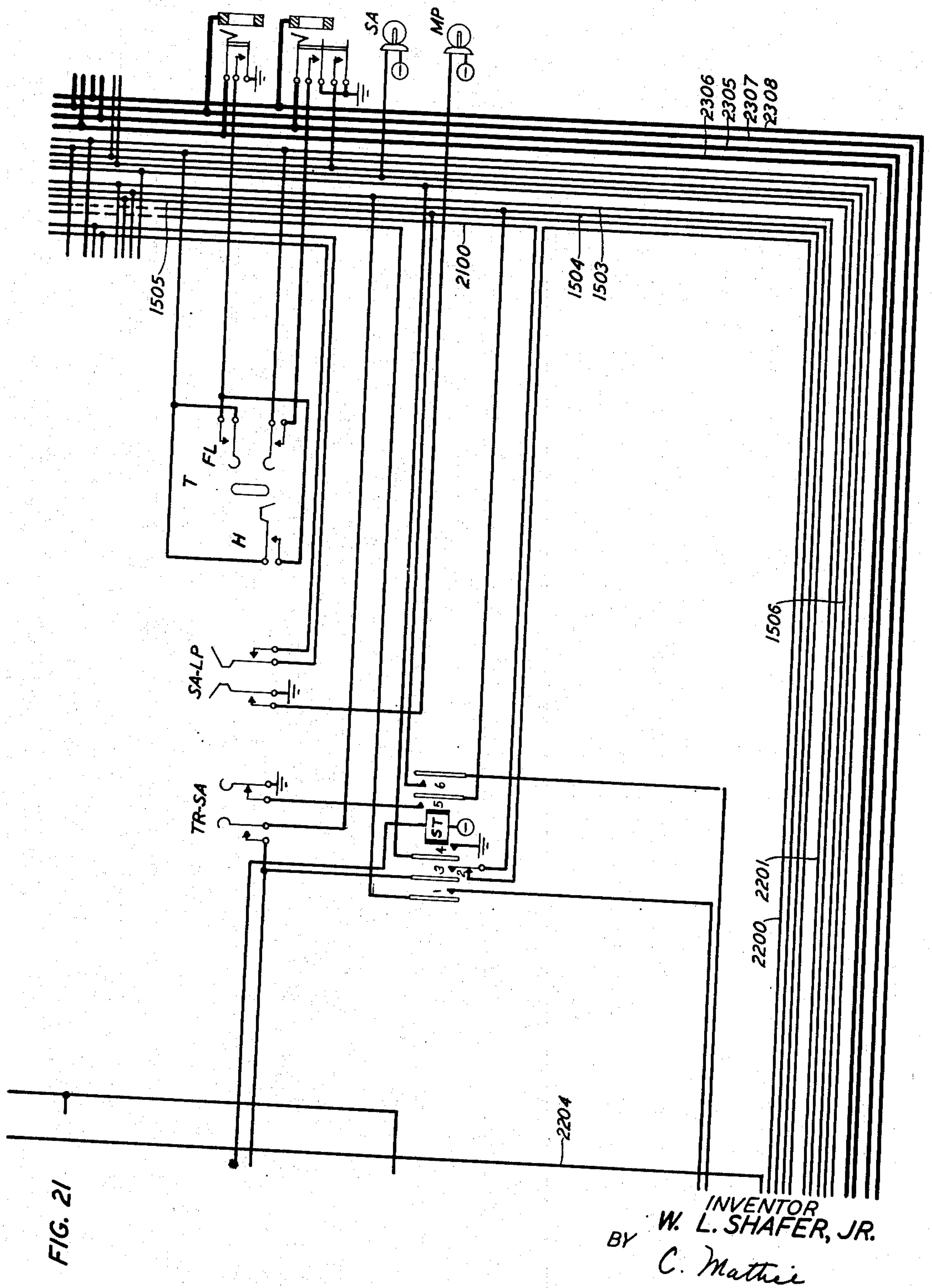
Figure 22:
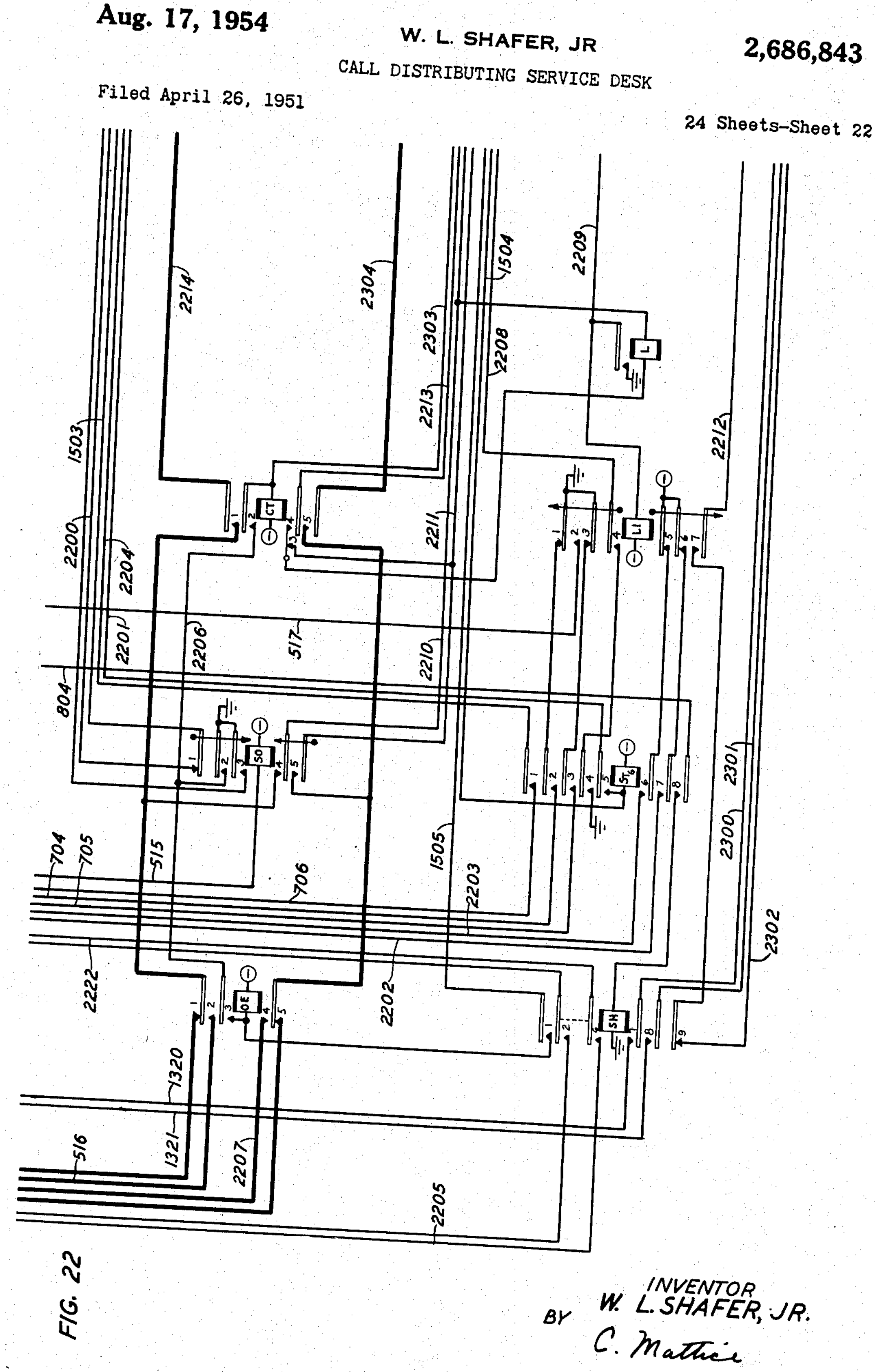
Figure 23:
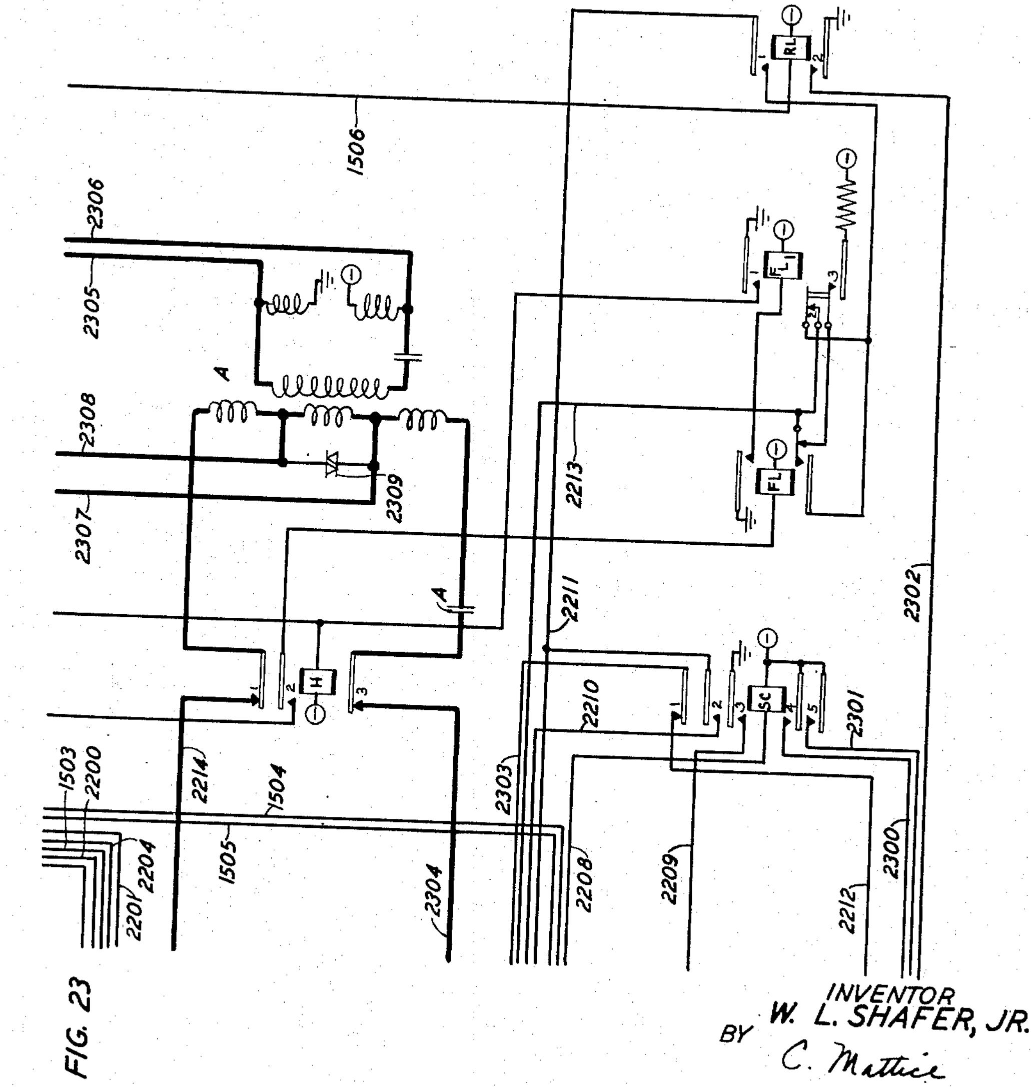
Figure 24:
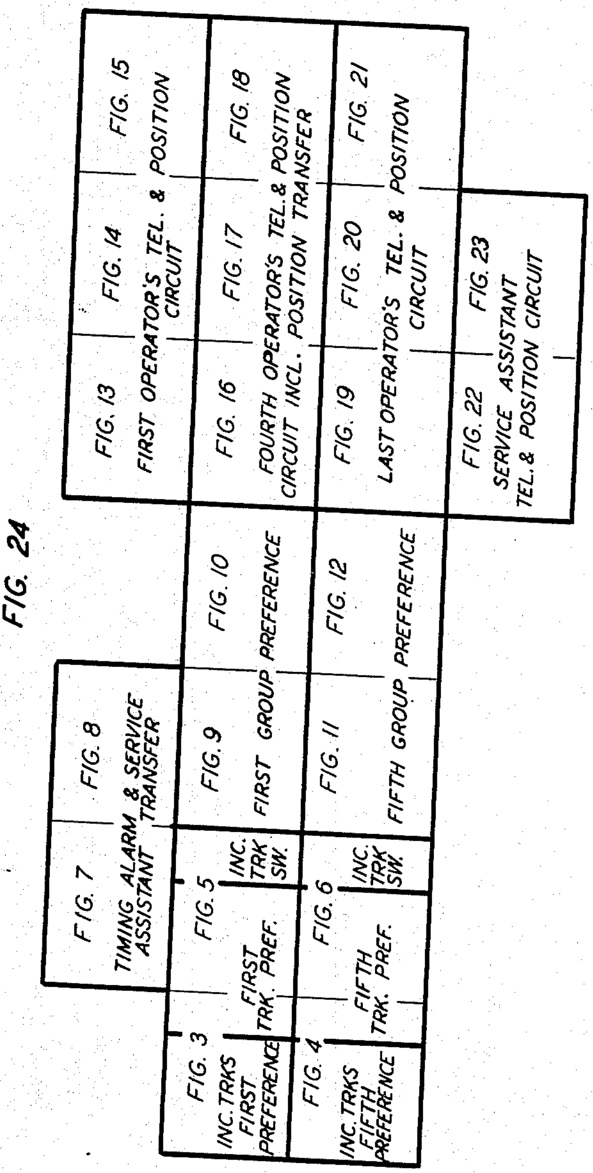

Figs. 3 and 4 showing trunks of two preferences with the associated trunk lock-out circuits;

Figs. 5 and 6 showing the trunk subgroup relays of the two preferences and two crass-bar switches;

Figs. 7 and 8 showing the common timing and control circuits as well as the service assistant's preference circuit;

Figs. 9 and 10 showing the first preference circuit;

Figs. 11 and 12 showing the last preference circuit;

Figs. 13 to 15 showing the first operator's position;

Figs. 16 to 18 showing an intermediate operator's position including the transfer circuit;

Figs. 19 to 21 showing the last operator's position;

Figs. 22 and 23 showing the service assistant's position;

Fig. 24 is a diagram showing the manner in which Figs. 3 to 23 should be arranged and in addition indicating the functions of the various figures.

In the detailed description, functional designations have been used. For convenience in locating the equipment in the drawings and in distinguishing similarly designated equipment, each designation is followed by the number of the figure in which the equipment is shown, enclosed in parentheses.

GENERAL DESCRIPTION

The operator's desk disclosed in the present application is especially designed for handling service calls such as calls for information, intercepted calls, etc., in which the operator does not complete any calls.

Specifically, it is designed for handling five services, namely:

1. Rate and route information
2. Toll information
3. Intercepting
4. Charge quoting
5. Local information However, as will appear hereinafter, the circuits are so arranged that any lesser number of services may be handled, and any desired order of preference may be assigned to those services handled.

The various offices in the area served by this service desk are provided with trunks individual to each type of service, and terminating in the levels of a cross-bar switch associated with the desk.

The trunks carrying each type of service are grouped into trunk preference groups and these groups are assigned an order of preference which may be that indicated above. A maximum of sixty trunks may be included in one group.

Figure 1:
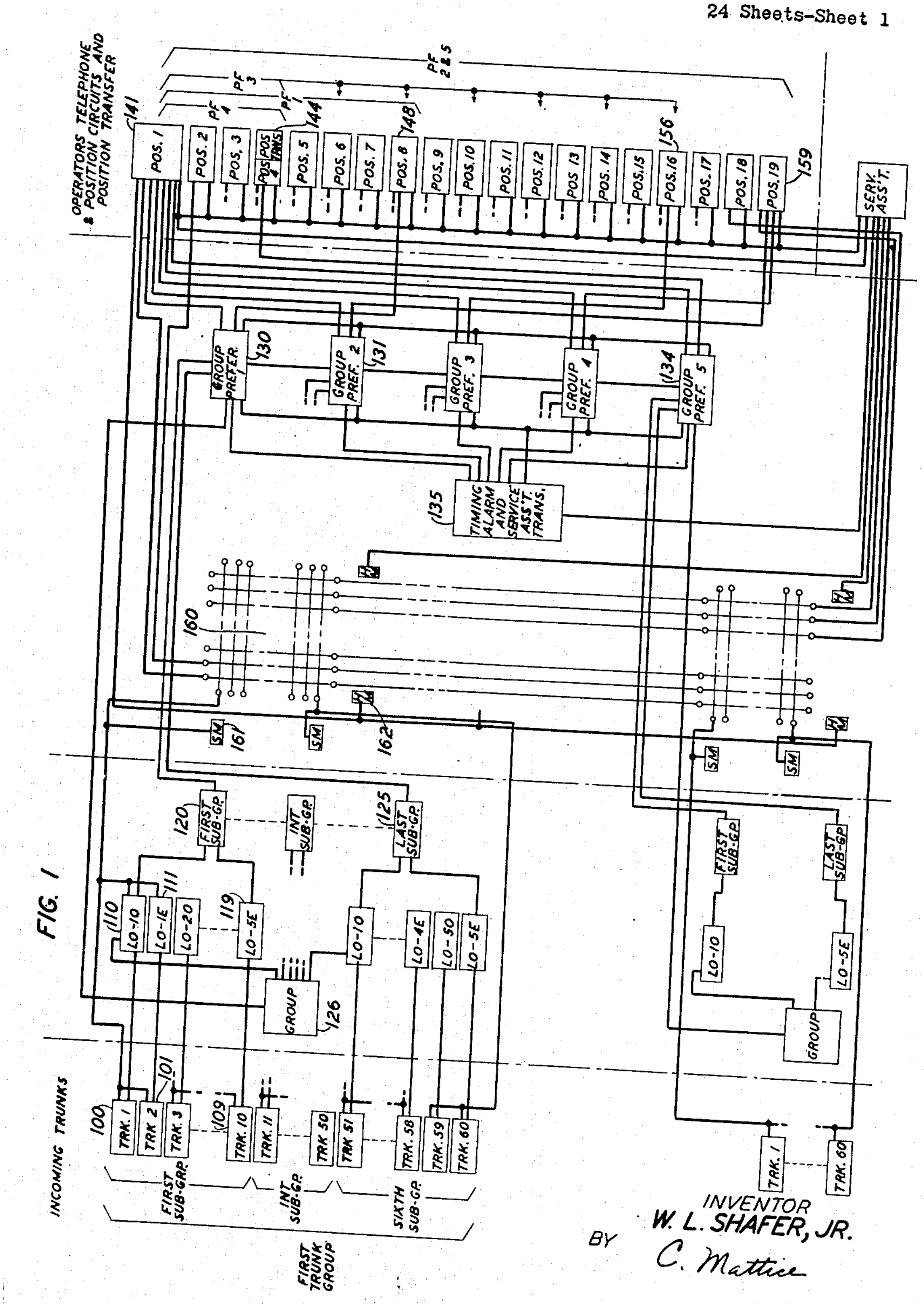
Fig. 1 is a diagrammatic showing of the call distributing arrangement.

Referring to Fig. 1, the sixty trunks of one group are divided into six subgroups. There is an individual lock-out relay for each trunk, a subgroup relay for each subgroup and a group or gate relay for each trunk group. For example, in the first trunk group, lock-out relay 110 is individual to trunk 100. When relay 110 or any other lock-out relay of the associated subgroup operates, it operates subgroup relay 120. When relay 120, or any other subgroup relay of the group, operates, it operates group relay 126.

In the control equipment there are five preference circuits 130 to 134, one for each trunk group and thereby for each type of service. The operation of a group relay, such as relay 126, in response to a call for a particular type of service, prepares the corresponding group preference circuit, such as group preference 130, for operation. However, due to the preference arrangement all calls in preference No. 1 take precedence over calls in preference No. 2 and so on.

Any necessary number of operators' positions may be provided, the typical arrangement shown in Fig. 1, using nineteen operators' positions 141 to 159. These positions are assigned to serve particular preferences by suitable cross-connections between the position and the preference circuits 130 to 134. In the arrangement shown, positions 1 to 4 serve all preferences, positions 5 and 7 serve preferences 1, 2 and 5, positions 6 and 8 serve preferences 1 to 3 and 5, positions 10, 12, 14 and 16 serve preferences 2, 3 and 5, while positions 9, 11, 13, 15, 17, 18 and 19 serve only preferences 2 and 5.

The connection between a trunk and a position is set up by means of a cross-bar switch such as switch 160 in which each select magnet such as magnet 161 is individual to a pair of trunks, such as trunks 100 and 101 and each hold magnet such as magnet 162 is individual to an operator's position such as position 141, so that two trunks, namely, an odd-numbered trunk and the next even-numbered trunk are connected to an operator's position by the operation of a cross-point. As will be shown hereinafter, the even-numbered trunk is normally connected to the operator's talking equipment and a relay, operated under the control of the lock-out relay of the odd-numbered trunk, transfers the connection to that trunk.

Figure 2:
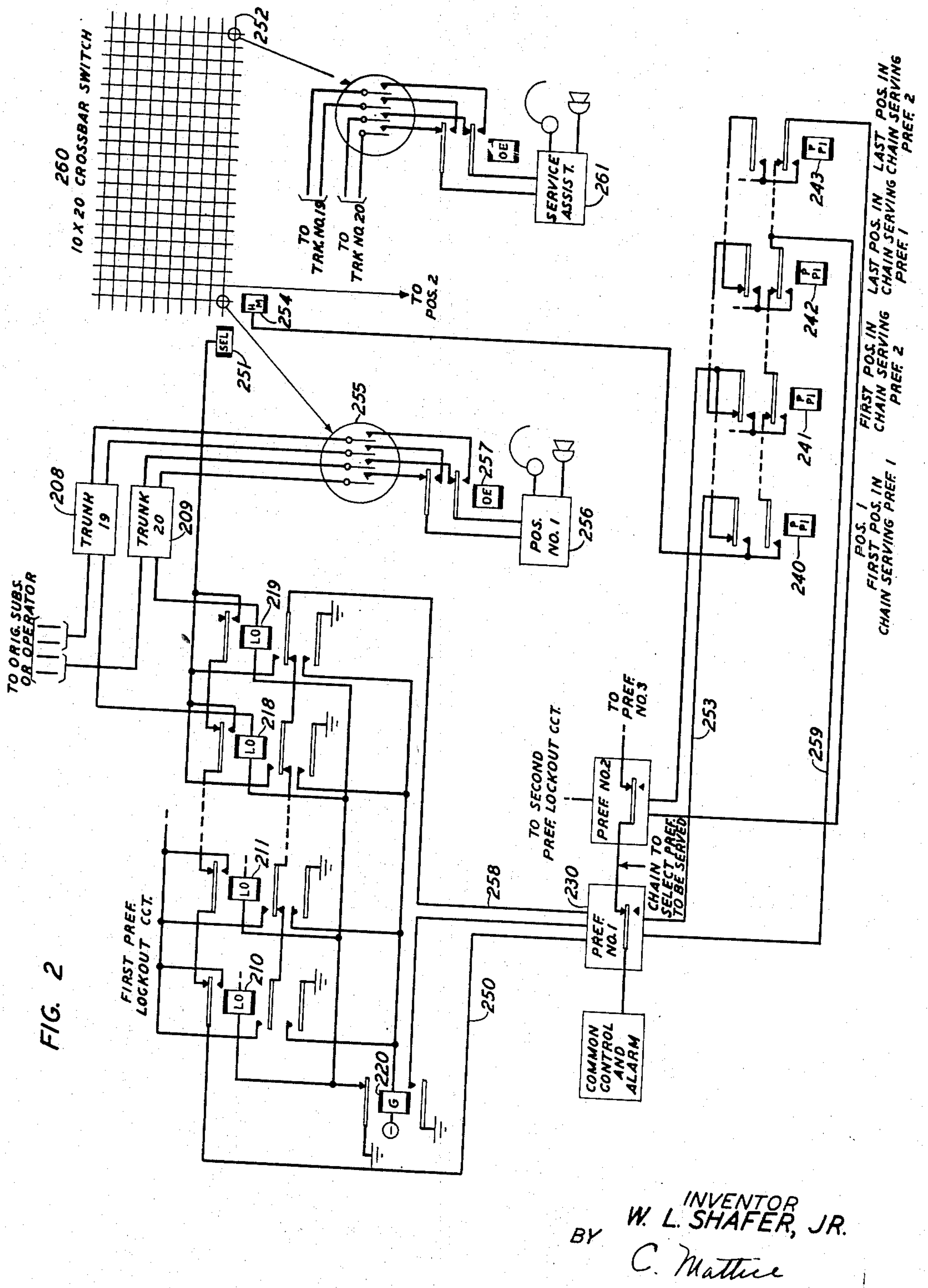
Fig. 2 is a schematic showing of the various preference circuits.

Fig. 2 shows in skeletonized form the preference circuits employed. When a call reaches a trunk such as trunk 208, the associated lock-out relay 218 is operated. Relay 218 locks up over a circuit (not shown) and operates gate relay 220 which opens the operating circuits for all of the lock-out relays, to prevent subsequent calls from being effective. The gate relay 220 initiates the operation of the corresponding preference circuit 230, which, being preference No. 1, takes precedence over any other preference circuits which may have calls waiting to be served.

The operators' positions are indicated by relays 240 to 243 which are operated when the corresponding position is available. Relays 240 to 242 represent positions wired to serve preference No. 1 while relays 241 to 243 represent positions wired to serve preference No. 2. The contacts of the trunk lock-out relays and of the position available relays are joined in two transfer chains, one of which starts with the lowest numbered relay and the other of which starts with the highest numbered relay. The preference circuit alternately activates these transfer chains. Assuming that the position associated with relay 240 is available and that preference 230 is in position to activate the chains that start with the lowest numbered relay, ground will be connected to conductor 250, over back contacts of the unoperated lock-out relays 210, 211, etc., of the lower numbered trunks and the front contact of relay 218 to the winding of select magnet 251 which prepares the cross-points of level 252 in the cross-bar switch 260. After select magnet 251 has operated the preference circuit 230 connects ground to conductor 253, completing a circuit over the front contact of relay 240 to the winding of hold magnet 254 which operates the corresponding cross-point in the level prepared by select magnet 251. This cross-point is shown in more detail at 255.

It will be observed that, had relay 219 been operated, in response to a call on trunk 209, the same select magnet and therefore the same cross-point would have been operated. Cross-point 255 closes through the talking conductors of trunks 208 and 209 to operator's position 256. The even-numbered trunk, trunk 20, is normally connected with the operator's talking circuit, but for odd-numbered trunks, relay 257 is operated as shown in the detailed circuits to connect the odd-numbered trunk, trunk 19, to the operator's talking circuit.

If the preference circuit 230 were in its alternate position, it would ground conductors 258 and 259, conductor 258 being extended over the back contact of relay 219 and the front contact of relay 218 to the select magnet 251, while conductor 259 is extended over back contacts of relays 242 and 241 and the front contact of relay 240 to the hold magnet 254.

If now, lock-out relays 210 and 219 were both operated to indicate that the corresponding trunks were waiting for service and both relays 240 and 242 were operated indicating that both positions were available to handle first preference calls, ground on conductor 250 would be extended over the front contact of relay 210 to the select magnet associated with the first trunk and ground on conductor 253 would be extended as before to hold magnet 254 so that the call on the first trunk would be served by the first position. During the next cycle of operation of preference circuit 230, ground on conductor 258 would be extended as above traced to select magnet 251 while ground on conductor 259 would be extended over the front contact of relay 242 to the hold magnet individual to that position so that the highest numbered trunk would be served by the highest numbered position.

A service assistant's position 261 is provided, to which calls may be transferred if necessary, this position being connected to the twentieth vertical of the cross-bar switch. Calls are transferred to this position by reoperating the select magnet of the trunk and then operating the twentieth hold magnet as will be described in connection with the detailed circuits.

DETAILED DESCRIPTION

*Single call*

The operation of the circuits in extending a call on one trunk to an operator's position will be described first. The effect of the preference circuits on the handling of a number of simultaneous calls will be described hereinafter.

Assuming that trunk circuit 300 is seized by an operator wishing rate and route information, relay L(3) is operated over the seizing circuit, closing an obvious circuit for relay L1(3). Relay L1(3) operates, closing a circuit from battery over its contact 4, contact 2 of relay FL(3), contact 4 of relay CO(3), through the winding and over contact 5 of lock-out relay LO1(3), conductor 301, to ground at contact 5 of gate relay G(5). Relay LO1(3), which is individual to trunk 300 in the trunk preference circuit, operates in this circuit and locks to ground over its contact 6, independent of relay G(5). At the same time, relay L1(3) closes a circuit from ground over its contact 2, contact 1 of relay CO(3), through the individual calls waiting lamp CW1(3) to battery, lighting lamp CW2(3) as an indication that a call is waiting for service on the associated trunk. In addition, relay L1(3) closes a circuit from the ringing source 302, through resistance lamp RT(3), condenser R(3), contact 1 of relay L1(3), contact 5 of relay CO(3), to conductor 303 leading to the calling operator's position.

The operation of relay LO1(3) in the trunk preference circuit closes a circuit for subgroup relay GP1(5) which may be traced from ground, supplied from the trunk circuit 300, over contact 2 of relay L1(3) and contact 1 of relay CO(3), contact 2 of relay LO1(3), conductor 305, winding of relay GP1(5) to battery. In addition, relay LO1(3) at its contact 7, closes a circuit for lamp CT1(3) and prepares other circuits which will be traced when completed.

Subgroup relay GP1(5) closes a circuit for gate relay G(5) which may be traced from ground over contact 5 of relay GP1(5), winding of relay G(5), conductor 500, to battery over contact 3 of normally operated relay GB(10) in the associated preference circuit. Relay GP1(5) also prepares other circuits which will be traced hereinafter.

Gate relay G(5), in operating, disconnects ground from conductor 301 and from the windings of all other relays like relay LO1(3) included in this trunk group, thereby preventing the operation of any other lock-out relay in response to calls on other trunks of the group. If, at this time, a call should come in on trunk 311, relay LO2(3) cannot operate. Lamp CW2(3) is lighted in a circuit similar to that traced for lamp CW1(3) and lamp CO2(3) is lighted in parallel with lamp CW2(3) over contact 1 of relay LO2(3).

Relay G(5) also connects battery to conductors 501 and 502 and ground to conductors 503 and 504 to initiate the operation of the associated preference circuit and the selection of an operator's position.

In order to provide a completely flexible arrangement by which operator positions may be assigned to preferences, a plurality of main conductors are provided for each preference, to which main conductors, branch conductors are cross-connected to the positions assigned to serve the various preferences. To safeguard the uninterrupted operation of the call distribution, in many cases connections are made from the preference circuit to each end of the main conductors, with duplicate circuits over which the preference circuit may function even if the main conductor is broken. Means, to be described hereinafter, is provided to detect and indicate a break in one of the main conductors.

One of these main conductors is a battery feed conductor and another is a ground feed conductor. The gate relay for each preference connects battery to the two ends of the battery feed conductor and ground to the two ends of the ground feed conductor. For preference No. 1, to which relay G(5) is individual, the battery feed conductor may be identified as conductor 1600, to which battery is connected at one end over conductor 501 and at the other end over conductor 502. The corresponding ground feed conductor may be identified as conductor 1601, to which ground is connected at one end over conductor 503 and at the other end over conductor 504. Branches of conductors 1600 and 1601 are extended to each operator's position assigned to serve the preference No. 1.

Similarly, each preference has a pair of start conductors over which the preference start relay, such as relay PS(9), is operated which extend through all of the operators' positions. For preference No. 1 these two conductors may be identified as conductors 1604 and 1605. Branches of these conductors also extend to those positions which are assigned to serve that preference. In order to test these conductors for continuity, relay PS(9) has two windings, one winding connected to one end of one start conductor and to the other end of the other start conductor, the second winding being connected to the opposite ends of the two conductors. Therefore, the windings are, in effect, energized in parallel.

When an operator's position is occupied, the position is marked occupied by the operation of a relay when the operator inserts the plugs of her headset in the jacks of the position. For example, when the plug of headset 1400 is inserted in jacks 1401 and 1402 of position No. 1, a circuit is closed from ground over contact 2 of jack 1401, contact 2 of hold key H(14), contact 2 of release key R(14), conductor 1403 to battery through the winding of relay PO(13), operating that relay to mark the position as occupied. When an operator's position is idle the relays like relays L1(13) and L2(13) are not operated.

In order to equalize the traffic among the operators, as each operator of a group assigned to a particular type of service answers a call, her position is held unavailable until all of the group have answered a call. When the last position of the group is made unavailable, a relay individual to that type of service, for example relay PB(10), is operated, as will be described hereinafter, connecting ground to conductors 1000, 1001, etc., leading to each position of the group. At the positions which are idle and occupied this ground completes a circuit for operating a relay to make those positions available. For example, assuming that relay PO(13) is operated to indicate that position No. 1 is occupied and relay L2(13) is released to indicate that the position is idle, ground connected to conductor 1000 completes a circuit over contact 8 of relay PO(13), contact 13 of relay L2(13), winding of relay P(13), contact 14 of relay L2(13) to battery. Relay P(13) operates in this circuit to mark the position available, and connects ground over its contact 5 to conductor 1000 to provide a holding circuit for itself independent of relay PB(10).

Therefore, assuming position No. 1 is assigned to serve preference No. 1, including trunks such as trunk 300, and that the position is occupied, idle and available when relay G(5) operates connecting battery to conductor 1600 and ground to conductor 1601, a circuit is closed from battery on conductor 1600, branch conductor 1300, contact 6 of relay L1(13), contact 1 of relay PO(13), branch conductor 1304, to one end of the first start conductor 1604 and thence over conductor 901, right winding of relay PS(9), conductor 902, contact 1 of normally operated relay GB(10), conductor 1602, to the other end of the other start conductor 1603 and over that conductor to branch conductor 1303, contact 9 of relay PO(13), contact 6 of relay L2(13), branch conductor 1301 to ground on conductor 1601. A circuit through the left winding of relay PS(9) may also be traced from ground on conductor 1601, branch conductor 1301, contact 6 of relay L2(13), contact 9 of relay PO(13), branch conductor 1303, to the one end of start conductor 1603 and thence over conductor 900, lift winding of relay PS(9), conductor 903, contact 5 of relay GB(10), conductor 1603, to the other end of start conductor 1604 and over that conductor to branch conductor 1304, contact 1 of relay PO(13), contact 6 of relay L1(13), branch conductor 1300 to battery on conductor 1600. Relay PS(9) operates in either or both of these two circuits.

Battery through the left winding of differential relay CPS(10) is connected to conductor 902 in parallel with the right winding of relay PS(9), while ground through the right winding of relay CPS(10) is connected to conductor 903 in parallel with the left winding of relay PS(9). When the above-traced circuits are closed for relay PS(9), conductor 902 is extended to ground on conductor 1601 and conductor 903 is extended to battery on conductor 1600 so that the two windings of relay CPS(10) are energized, but due to its differential winding relay CPS(10) does not close its contact during normal operations of the preference circuit. However, if one of the preference start circuits fails to be completed, relay CPS(10) does operate to perform functions which will be described hereinafter.

When relay PS(9) operates, it closes circuits for operating relays PGS(9) and SGS(9). The circuit for relay PGS(9) may be traced from battery, contact 7 of relay ARL(8), contact 2 of relay RL(8), conductor 800, contact 4 of relay GT(7), contact 1 of relay SS(7), conductor 700, contact 2 of relay PS(9), conductor 904, and thence over two branch conductors 1004 and 1005 to the two ends of a main conductor 1608 extending through all positions. With position No. 1 available as above assumed, conductor 1608 is connected over branch conductor 1308, contact 11 of relay P(13) and branch conductor 1305 to main conductor 1605 which is connected at the two ends over branch conductors 1006 and 1007 to conductor 905, winding of relay PGS(9), conductor 906, contact 8 of relay GB(10) to ground. Relay PGS(9) operates in this circuit and locks in a circuit from ground at contact 8 of relay GB(10) and through its winding over its contact 8, conductor 907, contact 7 of relay SPGS(7) to battery on conductor 800.

A branch of the above-traced circuit extends from battery to conductor 904, and thence over contact 14 of relay PGS(9), conductor 908, through the winding of relay ADP(10), conductor 1008, contact 1 of relay SGS(9), conductors 909 and 809, contact 3 of relay RL(8), contact 4 of relay ARL(8) to ground.

The circuit for relay SGS(9) may be traced from battery at contact 8 of relay ARL(8), contact 1 of relay RL(8), conductor 801, contact 5 of relay GT(7), contact 5 of relay SS(7), conductor 701, contact 4 of relay PS(9), conductor 910, and thence over two branch conductors 1009 and 1010 to the two ends of main conductor 1607 which extends through all of the positions. Assuming position No. 1 available, conductor 1608 is connected over branch conductor 1307, contact 6 of relay P(13), branch conductor 1306 to main conductor 1606, the two ends of which are connected over branch conductors 1011 and 1012 to conductor 911, winding of relay SGS(9), conductor 912 to ground over contact 6 of relay GB(10). Relay SGS(9) operates and locks in a circuit from ground on conductor 912, winding and contact 8 of relay SGS(9), conductor 913, contact 7 of relay SSGS(7) to battery on conductor 801.

A branch of the circuit for relay SGS(9) extends from battery to conductor 910 as above traced, over contact 14 of relay SGS(9), conductor 914, winding of relay ADS(10), conductor 1013, contact 1 of relay PGS(9), conductors 915 and 815, contact 4 of relay RL(8), contact 3 of relay ARL(8) to ground.

If no operator is available to serve this choice, the circuits of relays PGS(9) and SGS(9) will be open and in this event relays ADP(10) and ADS(10) operate to perform functions to be described hereinafter. However, relays ADP(10) and ADS(10) are slow to operate and the operation of either relay PGS(9) or SGS(9) will prevent the operation of either relay ADP(10) or ADS(10).

As previously mentioned the preference circuits alternately connect the highest-numbered trunk of a plurality seeking service at the same time to the highest-numbered available position and the lowest-numbered trunk of such a group to the lowest-numbered position available. For this purpose relays WP(9) and ZP(9) are provided, these relays being either both operated or both released when the preference circuit is idle. Assuming that relays WP(9) and ZP(9) are released at this time, the operation of relay PGS(9) closes a circuit from battery through resistance P1(9), winding and contact 4 of relay WP(9), contact 6 of relay PGS(9), conductor 916, contact 3 of relay ADS(10), contact 2 of relay ADP(10) to ground. A parallel circuit is closed from contact 4 of relay WP(9) over contact 6 of relay SGS(9), conductor 917, contact 1 of relay ADP(10), contact 2 of relay ADS(10) to ground.

Therefore, with either relay PGS(9) or relay SGS(9) operated, relay WP(9) operates and locks to ground over its contact 5. The operation of relay WP(9) closes a circuit from ground over its contact 5, winding of relay ZP(9), resistance P2(9) to battery, but relay ZP(9) cannot operate, since ground on the operating circuit for relay WP(9) is connected over contact 1 of relay ZP(9) to resistance P2(9) in shunt of the winding of relay ZP(9). Relay WP(9) at its contact 1 closes an obvious circuit for relay HM(9) which is both slow to operate and slow to release.

To insure that both relays PGS(9) and SGS(9) operate if either is operated, relay PGS(9) closes a supplementary operating circuit for relay SGS(9) which may be traced from ground over contact 6 of relay GB(10), conductor 912, winding of relay SGS(9), conductor 911, contact 7 of relay PGS(9), to conductor 913 and thence to battery as previously traced. Similarly, relay SGS(9) closes a supplementary operating circuit for relay PGS(9) which may be traced from ground over contact 8 of relay GB(10), conductor 906, winding of relay PGS(9), conductor 905, contact 5 of relay SGS(9) to conductor 907 and thence to battery as previously traced.

With relays PGS(9) and SGS(9) operated, indicating that a position is available to serve this call, a circuit is closed from ground on conductor 915 as above traced, contact 2 of relay PGS(9) or from ground on conductor 909 over contact 2 of relay SGS(9), contact 5 of relay ZP(9), conductor 918, contact 2 of relay GP1(5), conductor 505, contact 9 of relay LO1(3), conductor 306 to battery through the winding of select magnet SMO(5) individual to trunks 300 and 311 to prepare for the connection of trunk 300 to a position.

A branch of this circuit extends from conductor 306 in parallel with magnet SMO(5) over contact 4 of relay LO1(3), conductor 307, contact 4 of relay GP1(5), conductor 506 to battery through the winding of relay L(9). Relay L(9) operates in this circuit to indicate that the odd-numbered trunk is being served.

Relay HM(9) operates after an interval, due to its slow characteristic, during which the select magnet operates and the select fingers come to rest. With relay HM(9) operated, battery is connected over contact 13 of relay PGS(9) or contact 12 of relay SGS(9), contact 1 of relay HM(9), contact 8 of relay ZP(9), conductor 919, contact 2 of relay P(13) to ground through the upper winding of relay SP(13) at position No. 1 to select that position for use.

With relay SP(9) operated, a circuit is closed from ground over the contact of relay L(9), contact 11 of relay ZP(9) over contact 5 of relay PGS(9) or contact 7 of relay SGS(9), conductor 920, contact 4 of relay SP(13), conductor 1336, to battery through the winding of relay OE(14). Relay OE(14) operates in this circuit.

The operation of select magnet SMO(5) closes a circuit from ground over its auxiliary contact, over conductors 507 and 508 to the two ends of main conductor 1602. With relay SP(13) operated, individual to position No. 1, conductor 1602 is connected over branch conductor 1302, contact 5 of relay SP(13), conductor 1328 to battery through the winding of hold magnet HM1(5) which is also individual to position No. 1. With select magnet SMO(5) operated, preparing the cross-points of the corresponding level of the switch of Fig. 3, the operation of hold magnet HM1(5) closes cross-point 509, connecting trunk 300 to position No. 1.

Returning to the operation of the preference circuit, relays PGS(9) and SGS(9) close two circuits for operating relay GT(7) in the common equipment. One of these circuits may be traced from ground through the winding of relay CGT1(8), conductor 802, contact 3 of relay PGS(9), conductors 924 and 724, left winding of relay GT(7), conductor 702, contact 12 of relay PGS(9) to battery. The other circuit may be traced from ground through the winding of relay CGT2(8), conductor 803, contact 3 of relay SGS(9), conductors 921 and 721, right winding of relay GT(7), conductor 703, contact 13 of relay SGS(9) to battery. Relays CGT1(8) and CGT2(8) both operate, transferring the operating circuit of relay LGT(8) from their two back contacts to their two front contacts, relay LGT(8) being slow to release to cover the operating time of the two relays.

Relay GT(7) is also operated, connecting battery over its contact 2 to resistances T1(7) and T2(7) so that relays WT(7) and ZT(7) may operate under the control of interrupter CS(7) to measure a time interval. In addition, relay GT(7) opens the operating circuits for relays PGS(9) and SGS(9) but these relays are locked under the control of relays RL(8) and ARL(8).

When the hold magnet HM1(5) operates as above described, it closes a circuit from ground over its contact 2, conductor 510, contact 3 of relay SP(13), conductor 1329 to battery through the lower winding of relay SO(14). Relay SO(14) operates in this circuit and closes a circuit connecting relay L(14) to the trunk circuit. Relay SO(14) is slow to operate to permit the cross-point contacts to be closed by hold magnet HM1(5) before the circuit of relay L(14) is completed. The circuit for relay L(14) may be traced from battery through the winding of relay FL(3), lower right winding of repeating coil A1(3), conductor 308, contact 4 of cross-point 509, conductor 511, contact 2 of relay OE(14), contact 1 of relay SO(14), over contact 2 of relay FL(14) or over contact 1 of flashing key FL(14) and contact 5 of release key R(14) to the winding of relay L(14), contact 4 of key R(14), contact 5 of relay OE(14), conductor 1404, contact 3 of cross-point 509, conductor 309, upper right winding of repeating coil A1(3) to ground at contact 3 of relay L1(3). In addition, relay SO(14) closes a locking circuit for hold magnet HM1(5) which may be traced from battery through the winding of magnet HM1(5), contact 1 of magnet HM1(5), conductor 512, contact 3 of relay SO(14) to ground at contact 2 of jack 1401.

In the trunk circuit 300, the operation of relay FL(3) closes a circuit from battery over contact 4 of relay L1(3), contact 1 of relay FL(3) to ground through the winding of relay CO(3). Relay CO(3) operates and locks over its contact 2 to battery over contact 5 of relay L1(3). At its contact 1, relay CO(3) opens the circuit of lamp CWO(3) and at its contact 5 opens the ringing tone circuit. In addition, at its contact 4, relay CO(3) opens the circuit of relay LO1(3) in the trunk preference circuit which releases.

At the operator's position, relay L(14) closes a holding circuit for relay SO(14) which extends from battery over contact 1 of relay L(14) to ground through the upper winding of relay SO(14). Relay L(14) at its contacts 1 and 2 connects battery over conductors 1405 and 1406 to ground through the two windings of relay L1(13) operating the latter relay. Battery on conductors 1405 and 1406 is extended over contacts 2 and 1 of relay SP(13), conductors 1320 and 1321, to ground through the windings of release relay RL(8) in the common equipment.

Relay L1(13) when operated as above described, closes a circuit from ground over its contact 5 to battery through the winding of relay L2(13). Relay L2(13) operates and locks over its contact 11 and conductor 1322 to ground at contact 2 of relay SO(14). Ground on conductor 1322 also provides a locking circuit for relay OE(14) over contact 3 of that relay.

In addition, relay L1(13) closes a circuit from tone source 1323, condenser 1324, contact 1 of relay L1(13), conductor 1325, contact 3 of relay T1(14), contact 2 of relay T3(14), contact 3 of relay CT(14), contact 3 of key FL(14), contact 1 of key H(14), contact 3 of key R(14), left winding of the operator's repeating coil A(14), contact 1 of key R(14), contact 3 of key H(14), contact 1 of relay CT(14), conductor 1407, contact 4 of relay L1(13) to ground. This tone is transmitted through the right winding of repeating coil A(14) to the operator's telephone to inform the operator that a call has been extended to her position. Relay L1(13) also closes a circuit from ground over its contact 3, conductor 1326, contact 7 of relay CT(14), to battery through the winding of relay T1(14). Relay T1(14) operates in turn operating relay T2(14) which operates relay T3(14). Relay T1(14) opens the tone circuit above traced, which is again closed when relay T2(14) operates and is opened for the second time by relay T3(14). Since relays T1(14), T2(14) and T3(14) are each slow to operate, the operator hears two short intervals of tone.

When relay T3(14) operates to terminate the second tone interval, it closes a circuit from ground over its contact 1 to battery through the winding of relay CT(14). Relay CT(14) operates, locking over its contact 5 to ground on conductor 1322. At its contacts 1 and 3, relay CT(14) disconnects the left winding of the operator's repeating coil from the tone circuit and at its contacts 2 and 4 connects that winding in parallel with the winding of relay L(14) which is connected as previously traced to the repeating coil A1(3) of trunk 300 so that the operator may now converse with the calling operator and supply the desired information.

With relay CT(14) operated, the circuit of relay T1(14) is opened and that relay releases, followed by relays T2(14) and T3(14). A circuit is closed from ground on conductor 1326 over contact 6 of relay CT(14) to battery through lamp TRK(14) to further indicate that the trunk has been connected to the position.

When relay L2(13) operates as above described, it opens the circuits of relay P(13) and that relay releases to mark the position as unavailable. The release of relay P(13) in turn releases relay SP(13). In addition relays L1(13) and L2(13) open the branch circuits over which relay PS(9) operated, causing that relay to release.

In the common equipment, the operation of relay RL(8) as above described, opens both the operating and locking circuits of relays PGS(9) and SGS(9) in the preference circuit, causing these two relays to release. At its contact 3, relay RL(8) opens the operating circuit for select magnet SMO(5) causing that magnet to release.

The release of relays PGS(9) and SGS(9) opens the shunt around the winding of relay ZP(9), permitting that relay to operate under the control of relay WP(9). Relays PGS(9) and SGS(9) also open the circuits for relay GT(7) causing the latter relay to release, and remove battery from resistances T1(7) and T2(7) to stop the timing operation. Relay GT(7) is slow to release to allow relay ZP(9) time enough to operate before the preference can be reselected.

When the conversation is completed, if the calling operator disconnects first, relay L(3) is released, in turn releasing relays L1(3), CO(3) and FL(3), restoring the trunk circuit to normal. The release of relay L1(3) opens the circuit of relay L(14). The release of relay L(14) opens the circuit of relay L1(13) and that relay releases, in turn releasing relay SO(14). Relay SO(14) releases relay CT(14), relay L2(13) and relay OE(14). In addition it releases hold magnet HM1(5) opening cross-point 509 to disconnect the trunk from the position. If the calling operator relays releasing, the called operator may release by operating release key R(14), which opens the talking circuit to prevent a click to the operator. Key R(14) also opens the circuit of relay L(14) and the circuit of relay PO(13) so that the position appears unoccupied until the key is released. When key R(14) is released relay PO(13) reoperates, but the position cannot receive a new call until relay P(13) is reoperated as described.

*Simultaneous calls*

For the purpose of further describing the operation of the preference circuits, let it be assumed that calls are extended substantially simultaneously to trunk 300 in preference group No. 1 and to trunks 400 and 401 in preference group No. 5.

Trunk circuit 300 functions as previously described to operate relays LO1(3), GP1(5) and G(5), relay G(5) connecting battery and ground to the battery and ground conductors 1600 and 1601 individual to preference No. 1.

Trunk circuit 400 differs from trunk circuit 300 in two respects, namely, in that it provides for supervision to the originating operator, employing a high-low resistance arrangement, and in that it provides for a tone identification which is indicative of the group of offices at which the call originated. Trunk circuit 401 may be the same as either trunk circuit 300 or trunk circuit 400.

When trunk circuit 400 is seized a circuit is closed over conductor 402, upper left winding of repeating coil A(4), the two windings of relay L(4) in series, lower left winding of repeating coil A(4) and conductor 403, battery and ground being supplied at the calling office. Relay L(4) operates, closing an obvious circuit for relay L1(4). Relay L1(4) connects ringing tone from source 302, through resistance lamp RT(3), conductor 310, condenser R(4), contact 1 of relay L1(4), contact 6 of relay CO(4) to conductor 403.

At its contact 2, relay L1(4) connects ground over contact 1 of relay CO(4) to lamp CW1(4) and battery and also over contact 1 of relay LO1(4) to lamp CO1(4) and battery. At its contact 4, relay L1(4) connects battery over contact 3 of relay FL(4), contact 5 of relay CO(4), winding and contact 5 of relay LO1(4), conductor 413 to ground at contact 5 of gate relay G(6). Relay LO1(4) operates and locks to ground over its contact 6. Relay LO1(4) opens the circuit of lamp CO1(4) and closes an obvious circuit for lamp CT1(4).

Similarly, trunk circuit 401 functions to operate relay LO10(4) and light lamps CW10(4) and CO10(4), lamp CO10(4) being extinguished by relay LO10(4) which in turn lights lamp CT10(4).

Relays LO1(4) closes a circuit from ground over contact 2 of relay L1(4), contact 1 of relay CO(4), contact 2 of relay LO1(4), conductor 404 to battery through the winding of relay GP1 (6). Relay LO10(4) also closes a similar circuit for grounding conductor 404.

Relay GP1(6) closes a circuit over its contact 5, winding of relay G(6), conductor 600, contact 3 of normally operated relay GB(12) to battery. Relay G(6) connects battery over conductors 601 and 602 to battery conductor 1610 individual to preference No. 5 and ground, over conductors 603 and 604 to the corresponding ground conductor 1621.

Assuming that position No. 1 shown in Figs. 13 and 14, position No. 4 shown in Figs. 16 and 17 and position No. 29 shown in Figs. 19 and 20 are all occupied and idle, relays PO(13), PO(16) and PO(19) will be operated and relays L1(13), L2(13), L1(16), L2(16), L1(19) and L2(19) will all be unoperated. By referring to Fig. 1, it will be seen that positions No. 1 and No. 4 serve both trunk groups No. 1 and No. 5, while position No. 29 serves only trunk group No. 5.

Therefore, battery conductor 1600 of trunk group No. 1 will be connected to preference start conductor 1604 at position No. 1 over branch conductor 1300, contact 6 of relay L1(13), contact 1 of relay PO(13) and branch conductor 1304 and also at position No. 4 over branch conductor 1640, contact 6 of relay L1(16), contact 1 of relay PO(16) and branch conductor 1644. Ground conductor 1601 will be connected to preference start conductor 1603 at position No. 1 over branch conductor 1301, contact 6 of relay L2(13), contact 9 of relay PO(13) and branch conductor 1303 and at position No. 4 over branch conductor 1641, contact 6 of relay L2(16), contact 9 of relay PO(16) and branch conductor 1643.

Similarly, battery conductor 1610 of trunk group No. 5 is connected to preference start conductor 1614 at position No. 1 over branch conductor 1310, contact 5 of relay L2(13), contact 5 of relay PO(13) and branch conductor 1314; at position No. 4 over branch conductor 1650, contact 5 of relay L2(16), contact 5 of relay PO(16) and branch conductor 1654 and at position No. 29 over branch conductor 1910, contact 1 of relay L2(19), contact 5 of relay PO(19) and branch conductor 1914. Ground conductor 1611 is connected to preference start conductor 1613 at position No. 1 over branch conductor 1311, contact 10 of relay L2(13), contact 13 of relay PO(13) and branch conductor 1313; at position No. 4 over branch conductor 1651, contact 10 of relay L2(16), contact 13 of relay PO(16) and branch conductor 1653 and at position No. 29 over branch conductor 1911, contact 6 of relay L2(19), contact 13 of relay PO(19) and branch conductor 1913.

As previously traced, the preference start conductors 1603 and 1604 of trunk group No. 1, are connected together through the windings of relay PS(9), thereby operating relay PS(9). Similarly, the preference start conductors 1613 and 1614 are connected together through the windings of relay PS(11) causing the latter relay to operate. Relay PS(9) closes the circuits previously traced for relays PGS(9) and SGS(9) and these relays operate and lock. Relay PS(11) prepares circuits for relays PGS(11) and SGS(11), but with relay PS(9) operated, the preference chain is open at the contacts of relay PS(9) and the latter circuits are ineffective.

The relays corresponding to relays PS(9) and PS(11) belonging to trunk groups No. 2, 3 and 4 have contacts included in the preference chain so that the calls in the various trunk groups are handled in a fixed order of preference.

Assuming that relays WP(9) and ZP(9) were left operated after the last call in trunk group No. 1, when relays PSG(9) and SGS(9) operate, they connect ground on conductors 916 and 917 over their contacts 6 and contact 2 of relay ZP(9) to resistance P1(9) and battery in shunt of the winding of relay WP(9) causing that relay to release, relay ZP(9) being held operated under the control of relays PSG(9) and SGS(9) over contact 4 of relay WP(9). Relay WP(9) in releasing, in turn releases relay HM(9).

With relay ZP(9) operated and relay HM(9) released, a circuit is closed from battery over contact 12 of relay SGS(9) and contact 13 of relay PGS(9), contact 2 of relay HM(9), contact 7 of relay ZP(9), conductor 922 to the last position serving trunk group No. 1, and thence, assuming that the positions higher in number than position No. 4 are unavailable, over back contacts of relays corresponding to relay P(16) and over contact 4 of relay P(16) to ground through the lower winding of relay SP(16), operating relay SP(16) to select position No. 4 to serve this call.

From this circuit it will be apparent that the highest numbered available position is selected to serve a call when relay ZP(9) is operated and relay HM(9) is released.

Relays PGS(9) and SGS(9) also close a circuit for operating the select magnet SMO(5) individual to trunk 300, but with relay ZP(9) operated the circuit extends from ground to conductors 909 and 915 as previously traced, over contacts 2 of relays PGS(9) and SGS(9) and thence over contact 6 of relay ZP(9), conductor 923 over the back contacts of the higher numbered trunk subgroup relays, including contact 5 of relay GP6(5) and contact 7 of relay GP3(5), which are assumed to be unoperated, contact 6 of relay GP1(5), conductor 513, over the back contacts of the non-operated trunk lock-out relays of the subgroup, including contacts 9 of relay LO10(3), contacts 8 of relays LO9(3), LO2(3) and LO1(3), conductor 306 to battery through the winding of select magnet SMO(5).

From this circuit it will be apparent that if other trunks had been calling in this and other subgroups, the select magnet individual to the highest numbered trunk in the highest numbered subgroup would have been operated in place of select magnet SMO(5).

With relay SP(16) operated, the connection of ground to conductors 507 and 508 by select magnet SMO(5) operates the hold magnet individual to position No. 4 and the call is completed in the manner previously described. Relays L(17), L1(16) and L2(16) are operated, relay L2(16) releasing relay P(16) to render position No. 4 non-available and releasing relay PS(9). Relay L(17) also connects battery to the circuits for release relay RL(8) which operates, releasing relays PGS(9) and SGS(9) which in turn release relay GT(9). As soon as relay P(16) is released, relay SP(16) releases, opening the circuit of relay RL(8) and preference circuit No. 1 restores to normal.

Since, at this time, relay PS(11) individual to trunk group No. 5 is operated as above described, circuits are at once closed for operating relays PGS(11) and SGS(11), these circuits extending over back contacts of the relays like relay PS(9) in the earlier preferences. As soon as relays PGS(11) and SGS(11) have operated, relay GT(7) is operated so that if overlapping calls come in in the earlier preferences, although the associated PS relay may operate, they cannot operate their PGS and SGS relays and cannot interfere with the completion of this call. Relays PGS(11) and SGS(11) lock over back contacts of the corresponding relays of the earlier preferences.

The operation of the No. 5 preference circuit shown in Figs. 11 and 12 is substantially the same as described for the No. 1 preference circuit shown in Figs. 9 and 10. Assuming that relays WP(11), ZP(11) and HM(11) are operated when the preference circuit is seized, relays WP(11) and HM(11) will be released and relay ZP(11) held operated. Therefore, the operation of relays PGS(11) and SGS(11) will close a circuit from battery over contact 12 of relay PGS(11) or contact 11 of relay SGS(11), contact 2 of relay HM(11), contact 7 of relay ZP(11), conductor 1100, contact 3 of relay P(19) to ground through the lower winding of relay SP(19), thereby choosing the highest numbered available operator position to serve the call. With relay ZP(11) operated, a circuit is closed from ground connected to conductors 909 and 915 as previously traced, over contacts 2 of relays SGS(11) and PGS(11), contact 6 of relay ZP(11), conductor 1101, contact 5 of relay GP6(6), contact 7 of relay GP3(6) and similar back contacts of the intermediate subgroup relays, contact 6 of relay GP1(6), conductor 605, contact 8 of relay LO16(4), conductor 405 to battery through select magnet SM4(6) to prepare the cross-points of the corresponding level. A branch of this circuit extends from conductor 405 over contact 4 of relay LO16(4), conductor 406, contact 7 of relay GP1(6), contact 9 of relay GP3(6), contact 7 of relay GP6(6) and corresponding contacts of the intermediate subgroup relays, conductor 606 to battery through the winding of relay R(11) as an indication that the even trunk of the pair served by one cross-point is to be served. With relay R(11) operated the circuit for operating relay OE(20) is opened and the latter relay does not operate. The talking conductors 407 and 408 of trunk 401 are connected over contacts 1 and 2 of the cross-point closed by the hold magnet individual to position No. 29 (not shown) to conductors 2900 and 2901 which extend over back contacts 1 and 6 of relay OE(20) to the winding of relay L(20) and the operator's repeating coil A(20).

When the connection has been completed, release relay RL(8) is operated, and relays PGS(11), SGS(11), GT(7) and LO16(4) released. However, relay GP1(6) is held operated by relay LO1(4) due to the call on trunk 400, and in turn holds relay G(6) operated. If there is an occupied position at which the operator is not busy with a call, relay PS(11) will also be held operated.

*No positions available*

Assuming that no higher preference calls have been received, relay PS(11) attempts to operate relays PGS(11) and SGS(11). However, positions No. 1, No. 4 and No. 29 have now each been used and rendered unavailable by the release of relays P(13), P(16) and P(19). Assuming that all the other positions have also been made unavailable, the circuit closed by relay PS(11) from battery on conductor 701 over contact 3 of relay PS(9), the corresponding contacts of the intermediate PS relays and contact 2 of relay PS(11) to conductor 1102 for operating relay SGS(11), extends over contact 13 of relay SGS(11), conductor 1103, winding of relay ADS(12), conductor 1200, contact 1 of relay PGS(11) to ground over conductors 1115 and 815. The circuit closed from battery on conductor 700 over contact 1 of relay PS(8), the corresponding contacts of the intermediate PS relays and contact 1 of relay PS(11) to conductor 1104 for operating relay PGS(11), extends over contact 13 of relay PGS(11), conductor 1105, winding of relay ADP(12), conductor 1201, contact 1 of relay SGS(11) to ground over conductors 1109 and 809. Relays ADS(12) and ADP(12) are slow to operate, and if a position were available to serve trunk group No. 5, the operation of relays PGS(11) and SGS(11) would open the above-traced circuits before relays ADS(12) and ADP(12) can operate. Assuming that no positions are marked available, relays ADS(12) and ADP(12) operate, closing obvious circuits for operating relay PB(12). Relay PB(12) connects ground to conductors 1000, 1001, 1202, etc., there being a separate conductor for each position that serves this preference. To obtain sufficient contacts for this purpose, the operating circuits of relay PB(12) may be extended over contacts 1 and 2 of that relay to operate similar relays.

Assuming that position No. 1 is now idle so that relays L1(13) and L2(13) are released, ground on conductor 1000 completes a circuit over contact 8 of relay PO(13), contact 13 of relay L2(13), winding of relay P(13) to battery at contact 14 of relay L2(13). Relay P(13) operates and connects ground over its contact 5 to conductor 1300 to lock itself under the control of relay L2(13) and to mark the position available. Other positions which are idle and occupied and assigned to serve trunk group No. 5 will also be made available. With one or more positions made available, relays PGS(11) and SGS(11) may operate and the call on trunk 400 be extended to an operator's position in the manner previously described.

Assuming that position No. 1 is selected to serve the call on trunk 400, cross-point 607 will be operated, followed by relay SO(14), whereupon a circuit is closed from battery through the winding of relay FL(4), lower right winding of repeating coil A(4), conductor 409, contact 4 of cross-point 604, conductor 511, contact 2 of relay OE(14), contact 1 of relay SO(14), contact 2 of relay FL(14), winding of relay L(14), contact 4 of key R(14) contact 5 of relay OE(14), conductor 1404, contact 3 of cross-point 607, conductor 410, upper right winding of repeating coil A(4) to ground at contact 3 of relay L1(4).

Relay FL(4) closes a circuit from battery over contact 4 of relay L1(4), contact 2 of relay FL(4) to ground through the winding of relay CO(4). Relay CO(4) operates and locks over its contact 2 to battery over contact 5 of relay L1(4). Although the trunk has now been connected to the operator's position equipment, talking cannot take place since the right windings of the trunk repeating coil A(4) are short-circuited over contacts 1 and 3 of relay TR(4).

Relay CO(4) in operating connects a high tone, supplied to conductor 411, through condenser TN(4), contact 3 of relay CO(4), contact 6 of relay TR(4) to conductor 409 and thence over the circuit above traced to ground so that the operator hears the characteristic tone. The operator responds to this tone by operating and releasing her flashing key FL(14).

As soon as relay L2(13) operated, in response to the operation of relay L(14) a circuit was closed from battery through the winding of relay FL(14), conductor 1408, contact 12 of relay L2(13), conductor 1327 to ground at contact 4 of key FL(14). Relay FL(14) in operating opens one branch of the circuit of relay L(14). When now, key FL(14) is operated, the circuit of relay FL(14) is opened and that relay releases after an interval determined by its slow-to-release character. At its contact 1, key FL(14) opens the talking circuit, causing relay FL(4) to release. In addition, key FL(14) connects battery through resistance A(14), over contact 1 of relay FL(14), contact 2 of key FL(14), contact 5 of key R(14) to the winding of relay L(14) to hold that relay operated. Key FL(14) at contact 3 opens the circuit through the operator's repeating coil A(14) to prevent clicks in the operator's telephone.

The release of relay FL(4) in the trunk circuit, closes a circuit from ground through the right winding of relay TR(4), contact 4 of relay CO(4), contact 3 of relay FL(4), contact 4 of relay LI(4) to battery. Relay TR(4) operates and closes a locking circuit for itself from ground through its left winding and over its contact 5 to battery over contact 5 of relay LI(4). With relay TR(4) operated, the tone circuit is opened, as well as the shunts around the right windings of repeating coil A(4), which are now connected together through condenser B(4) and contact 2 of relay TR(4). Relay TR(4) at its contact 4 short-circuits resistance A(4).

When relay FL(14) releases, the holding circuit of relay L(14) is opened and the connection of the latter relay to the two trunk conductors is restored, permitting relay FL(4) to reoperate as well as relay FL(14). Relay FL(4) short-circuits the lower winding of relay L(4) to reduce the resistance in the incoming circuit as a supervisory signal to the originating operator. When key FL(4) is restored the talking circuit through the left winding of repeating coil A(14) is reclosed and conversation may take place.

*Transfer to service assistant*

When an operator, to whom a call has been routed, for example the operator at position No. 1, finds that she requires assistance she may signal a service assistant by operating the service assistant's lamp key SA-LP(15). At contact 1, key SA-LP(15) lights a lamp MP(15) individual to that position. At its contact 2, key SA-LP(15) connects interrupted ground supplied by relay INT(15) to lamp SC(15). The service assistant may insert her headset plug into the spare jacks at the position and find out what the difficulty is. Key SA-LP(15) is then released. If the service assistant finds that the information required may take some time to obtain, she will instruct the operator at position No. 1 to transfer the call to the service assistant position and will then insert her headset plug in one of the sets of jacks at that position, for example jacks 1500 and 1501.

In order to transfer the call, the operator at position No. 1 operates key TR-SA(15). With this key operated a circuit is closed from battery through the winding of relay ST(15), conductor 1502, contact 10 of relay CT(14), conductor 1409, contact 1 of key TR-SA(15), conductor 1503, contact 1 of relay SO(22), conductor 2200, contact 2 of relay ST(21), conductor 2100, contact 3 of relay ST(18), conductor 1800, contact 3 of relay ST(15) to ground. Relay ST(15) operates in this circuit and locks to ground at its contact 4 independent of key TR-SA(15). It will be observed that the ground supply to the above traced circuit includes normal contacts on the ST relays at each position so that only one position can transfer a call to the service assistant's position at a time. As soon as relay ST(15), or the corresponding relay of any other position operates, it renders the TR-SA keys at all positions ineffective.

Key TR-SA(15) is operated only briefly and is then restored, closing a circuit from ground over contact 2 of that key, contact 6 of relay ST(15), conductor 1504 to battery through the winding of relay STG(22). Relay STG(22) operates and locks over its contact 5, conductor 2201 to ground at contact 5 of relay ST(15).

Relay STG(22) closes battery and ground to the service assistant's preference circuit of Fig. 7, closing a circuit from battery over contact 6 of relay LI(22), contact 7 of relay STG(22), conductor 2202, right winding of relay SS(7), contact 3 of relay GBS(7), conductor 704, contact 2 of relay STG(22), contact 1 of relay LI(22) to ground. A second circuit is closed from battery over contact 5 of relay LI(22), contact 6 of relay STG(22), conductor 2203, contact 5 of relay GBS(7), left winding of relay SS(7), conductor 705, contact 3 of relay STG(22) to ground over contact 3 of relay LI(22).

Relay SS(7) occupies the first position in the preference chain. If relay GT(7) is not operated, or as soon as that relay releases following the completion of a previously started connection, relay SS(7) closes a circuit from battery on conductor 800, contact 4 of relay GT(7), contact 2 of relay SS(7) winding of relay SPGS(7) to ground at contact 8 of relay GBS(7) and a second circuit from battery on conductor 801, contact 5 of relay GT(7), contact 4 of relay SS(7), winding of relay SSGS(7) to ground at contact 6 of relay GBS(7). Relay SPGS(7) operates and locks over its contact 6 to battery on conductor 800, while relay SSGS(7) operates and locks over its contact 6 to battery on conductor 801.

Relay SPGS(7) closes a circuit from ground on conductor 815 to conductor 706, while relay SSGS(7) closes a circuit from ground on conductor 809 to conductor 706, the circuit extending thence over contact 1 of relay STG(22), conductor 2204, contact 2 of relay ST(15), conductor 1507, to the set of cross-points individual to operator position No. 1 in the cross bar switch. Assuming that cross-point 509 is closed to connect trunk 300 with position No. 1 as has been previously described, the above traced circuit extends over contact 5 of cross-point 509 to battery through the winding of select magnet SMO(5) individual to the pair of trunks including trunk 300.

Relay SPGS(7) at its contact 5 and relay SSGS(7) at its contact 2, connect ground to conductor 707, completing a circuit over contact 2 and through the winding of relay WS(8) resistance S1(8) to battery. Relay WS(8) operates and locks to ground over its contact 3, at the same time closing a circuit from ground over its contact 3 through the winding of relay ZS(8) and resistance S2(8) to battery. Relay ZS(8) does not operate, being shunted by ground on conductor 707 over its contact 1. Relays WS(8) and ZS(8) are similar to relays WP(9) and ZP(9) so that, between operations of the service assistant's preferance circuit, relay WS(8) and relay ZS(8) are either both operated or both released and during alternate uses of the circuit either relay WS(8) is operated and relay ZS(8) non-operated, or relay WS(8) is released and relay ZS(8) is held operated. With relay WS(8) operated an obvious circuit is closed for relay HTS(8) which is slow to operate and release.

Relays SPGS(7) and SSGS(7) also close circuits for operating relay GT(7) to prevent any other preference circuit from functioning, relay SPGS(7) connecting battery over its contact 8 to conductor 702 and the left winding of relay GT(7), relay SSGS(7) connecting battery over its contact 9 to conductor 703, and the right winding of relay GT(7) extending thence to ground as previously traced.

Relay SPGS(7) at its contact 9 and relay

SSGS(7) at its contact 8 connect battery to conductor 703, completing a circuit over contact 2 of relay HTS(8), contact 4 of relay ZS(8), conductor 804, contact 8 of relay STG(22) to ground through the winding of relay SH(22). Relay SH(22) closes a circuit from ground over the contact of select magnet SMO(5), conductors 507 and 2222, contact 6 of relay SH(22), conductor 2205 to battery through hold magnet HM20(5) individual to the service assistant's position in the switch at which trunk 300 appears. With select magnet SMO(5) operated, the operation of hold magnet HM20(5) closes cross-point 514. At this time trunk 300 is connected to both position No. 1 and the service assistant's position.

It will be remembered that when trunk 300 was connected to position No. 1, relay OE(14) was operated. With relay SH(22) operated, a circuit is closed from ground at contact 4 of relay OE(14), conductor 1410, contact 7 of relay ST(15), conductor 1505, contact 1 of relay SH(22) to battery through the winding of relay OE(22). Relay OE(22) operates in this circuit to connect the service assistant's talking conductors to the odd trunk.

Hold magnet HM20(5) connects ground to conductor 515, completing a circuit to battery through the winding of relay SO(22). Relay SO(22) operates slowly and connects ground to conductor 2206 to provide a locking circuit for relay OE(22). With relay SO(22) operated, a circuit is closed between trunk 300 and the service assistant's position which may be traced from trunk conductor 309, contact 3 of cross-point 514, conductor 516, contact 2 of relay OE(22), contact 4 of relay SO(22), conductor 2210, winding of relay L(22), contact 3 of relay CT(22), conductor 2211, contact 5 of relay SO(22), contact 4 of relay OE(22), conductor 2207, contact 4 of cross-point 514 to conductor 308. Relay L(22) is therefore in parallel with relay L(14) and operates, closing an obvious circuit for relay L1(22).

Relay L1(22) closes a locking circuit for hold magnet HM20(5) which may be traced from battery through the winding and over contact 2 of that magnet, conductor 517 to ground at contact 2 of relay L1(22). In addition relay L1(22) opens the circuits of relay SS(7) and closes a circuit from ground over contact 4 of relay STG(22), contact 4 of relay L1(22), conductor 2208 to battery through the winding of relay SC(23). Relay SC(23) at its contact 3 connects ground to conductor 2209 to provide a holding circuit for relay L1(22). At its contact 2 relay SC(23) connects conductors 2210 and 2211 together thereby short-circuiting relay L(22) as well as relay L(14).

In addition relay SC(23) connects battery over its contacts 4 and 5 to conductors 2300 and 2301 which are extended over contacts 7 and 8 of relay SH(22) to conductor 1320 and 1321 and to ground through the windings of relay RL(8) to release the preference circuit.

The release of relay L(14) at position No. 1 brings about the release of that position and of cross-point 509, to disconnect the position from the trunk which now remains connected to the service assistant's position over cross-point 514. The release of cross-point 509 releases select magnet SMO(5). The release of relay CT(14) at position No. 1, opens the circuit of relay ST(15) which releases, in turn releasing relay STG(22). Relay STG(22) in turn releases relay SC(23) which removes the short circuit from relay L(22) permitting that relay to reoperate. Relay SC(23) released, restores the control of relay L1(22) to relay L(22) and opens the circuits of release relay RL(8).

Relay STG(22) also opens the circuit of relay SH(22) which also releases. If or when the service assistant has inserted her headset in jacks 1500 and 1501 as previously assumed, a circuit is closed from ground over contact 2 of jack 1501, conductor 1506 to battery through the winding of relay RL(23). With relay RL(23) operated, the release of relay SH(22) closes a circuit from ground over contact 2 of relay RL(23), conductor 2302, contact 9 of relay SH(22), contact 7 of relay L1(22), conductor 2212, contact 1 of relay SC(23), conductor 2303 to battery through the winding of relay CT(22).

Relay CT(22) operates and locks over its contact 2 to ground on conductor 2206. Relay CT(22) extends the talking circuit to repeating coil A(23), the circuit extending from conductor 516 over contact 2 of relay OE(22), contact 1 of relay CT(22), conductor 2214, contact 1 of relay H(23), left winding of repeating coil A(23), condenser A(23), contact 3 of relay H(23), conductor 2304, contact 5 of relay CT(22), contact 4 of relay OE(22) to conductor 2207. The right winding of repeating coil A(23) is connected over conductors 2305 and 2306 to the tips of jacks 1500 and 1501 while the middle left winding of coil A(23), bridged by varistor 2309 is connected over conductors 2307 and 2308 to the sleeves of jacks 1500 and 1501 to which the service assistant's telephone is connected.

With relay CT(22) operated the circuit previously traced for relay L(22) is opened at contact 3 of relay CT(22) and reclosed to extend from conductor 2210, through the winding of relay L(22), over contact 4 of relay CT(22), conductor 2213, contact 2 of relay FL1(23), contact 1 of relay RL(23), to conductor 2211.

The connection between the incoming trunk and the service assistant's position may be released from either end.

When the originating operator disconnects, relays L(3) and L1(3) release, relay L1(3) opening the circuit of relay L(22). Relay L(22) releases relay L1(22), which opens the holding circuit for hold magnet HM20(5), thereby releasing cross-point 514 and disconnecting the trunk from the position. Hold magnet HM20(5) in releasing opens the circuit of relay SO(22) which also releases, opening the locking circuits of relays OE(22) and CT(22) so that the latter relays also release.

When the service assistant removes her headset from jacks 1500 and 1501, relay RL(23) releases, opening the circuit of relay L(22) which releases to further release the position circuit as above described.

*Transfer to another switchboard*

To meet the decrease in traffic at the approach of the light load period, positions will be vacated until only one or two positions assigned to serve all types of trunks are left in service. If the traffic is sufficiently light, it may even be desirable to transfer all calls normally served by this desk to some other desk or switchboard. For this purpose, one of the positions assigned to serve all types of trunks is provided with circuits for making such a transfer. The position having the transfer circuits will be the last one to be vacated.

As indicated in Fig. 1, position No. 4 is so equipped, the circuits being shown in detail in the upper part of Fig. 18. When transfer is to take place, key TR(18) is operated, lighting the transfer lamp TR(18) and operating relay TR(18). Relay TR(18) connects ground to conductor 1801 leading to the No. 4 position. It will be understood that, if desired, more than one position might be equipped for transfer and in that case relay TR(18) would ground a conductor leading to each such position.

The operator at position No. 4 now withdraws her headset plug 1700 from the position jacks 1701 and 1702, whereupon a circuit is closed from ground on conductor 1801 over contact 1 of jack 1702, contact 1 of jack 1704, conductor 1705, contact 1 of relay SO(17), conductor 1706, to battery through the winding of relay PT(18). Relay PT(18) operates and locks over its contact 9 to ground over conductor 1705, independent of relay SO(17). It may be noted that, relay PT(18) cannot be operated until relay SO(17) is released to prevent interference with a call in progress.

With position No. 4 equipped for transfer, the operating circuit of the position-occupied relay PO(16) normally extends from battery through the winding of relay PO(16), conductor 1660, contact 2 of release key R(17), contact 2 of hold key H(17), conductor 1707, contact 11 of relay PT(18), conductor 1802 to ground at contact 2 of jack 1701.

With relay PT(18) operated, conductors 1660 and 1707 are connected over contacts 10 and 12 of relay PT(18) to ground at contact 5 of relay SL1(18), thereby operating relay PO(16) to give a position-occupied indication to the preference circuits.

The circuit for relay L(17) and the talking circuit are also normally completed over back contacts of relay PT(18) and are now extended to the transfer circuit.

With relay PO(16) operated, an incoming call will be directed to position No. 4 in the manner previously described. The operation of the switch hold magnet to close the proper cross-point operates relay SO(17) in the manner previously described, and extends the talking conductors of the trunk to conductors 1708 and 1709. Relay SO(17) at its contact 2 connects ground to conductor 1705 to hold relay PT(18) operated until the end of the call in case key TR(18) is released at that time. Relay SO(17) also connects grounded conductor 1707 to conductor 1712 to lock the associated hold magnet. A circuit is then closed from conductor 1708, over contact 3 of relay SO(17), conductor 1710, contact 4 of relay PT(18), contact 1 of relay FL(18), contact 2 of relay SL1(18), contact 8 of relay PT(18), conductor 1803, winding of relay L(17), conductor 1711, contacts 6 and 2 of relay PT(18), to conductor 1709.

Relay L(17) operates and performs the functions previously described. Relay L1(16) closes a circuit from ground over its contact 3, conductor 1661, contact 14 of relay PT(18) to battery through the winding of relay L1(18). Relay L1(18) at its contact 5 closes a supplementary circuit for relay PO(16). At its contact 6, it closes a circuit from ground at contact 6 of relay SL1(18) to operate transfer register TR(18). In addition, relay L1(18) connects ringing tone from source 1804 through ballast lamp R(18) and condenser A, contact 1 of relay L1(18), contact 1 of relay SL1(18) and contact 4 of relay PT(18) to conductor 1710 and thence to the calling line. Relay L1(18) also closes a circuit from battery over its contact 2, contact 3 of relay SL1(18) to ground through the calling lamp L(18) at the switchboard to which the call is to be transferred.

When the operator, at whose position the answering jack ANS(18) appears, answers by inserting the answering plug of her cord in jack ANS(18), a circuit is closed from battery on the sleeve of the cord, sleeve of jack ANS(18), upper high resistance winding of relay SL(18) to ground. Relay SL(18) operates in this circuit, closing an obvious circuit for relay SL1(18), which operates and locks over its contact 4 to ground at contact 3 of relay L1(18).

Relay SL1(18) disconnects the ringing tone, releases register TR(18) and extinguishes lamp L(18). Relay SL1(18) at its contact 2 opens a link in the previously traced circuit for relay L(17) but at this time, relay SL(18) at its contact 1 has closed a substitute link so that relay L(17) remains operated. The talking circuit extends from the trunk to conductor 1708, contact 3 of relay SO(17), conductor 1710, contact 4 of relay PT(18), contact 4 of relay FL(18), condenser R(18) to the ring of jack ANS(18) and from the trunk to conductor 1709, contact 2 of relay PT(18), condenser T(18) to the tip of jack ANS(18).

When the calling operator disconnects, relay L(17) is released as previously described, in turn releasing relay L1(16) and relay L1(18). Relay L1(18) connects ground over its contact 4 to the lower winding of relay SL(18) to reduce the resistance in the sleeve circuit of jack ANS(18) as a release signal to the operator. With relay SL1(18) operated and relay L1(18) released the circuit of relay PO(16) is opened to prevent the position being made available prematurely. When the operator removes her plug from jack ANS(18) relay SL(18) releases, followed by relay SL1(18), relay PO(16) reoperates and the circuit is ready to handle another call.

If the switchboard operator removes her plug first, relay SL(18) releases, but relay SL1(18) is locked under the control of relay L1(18). The release of relay SL(18), with relay SL1(18) held operated, opens the circuit of relay L(17) and restores the position and transfer circuit to normal.

When it is desired to end the transfer of calls, key TR(18) is restored, in turn releasing relay TR(18). If a call is in progress, relay PT(18) is locked operated over its contact 9 and conductor 1705 to ground at contact 2 of relay SO(17) until the latter relay releases at the termination of the call. Relay PT(18) then releases, restoring position No. 4 to normal.

*Night alarm*

If, during periods of light load, an operator is present but does not occupy one of the positions of this switchboard, a night alarm may be brought into service by the operation of key NA(7).

Under this condition, when the gate relay of any trunk group operates, for example relay G(5), relay PS(9) cannot operate with no position occupied and a calls waiting indicating relay CW(5) is operated in a circuit from battery through the winding of relay CW(5), contact 7 of relay G(5), conductor 518 to ground at contact 6 of relay PS(9) in the associated preference circuit. Relay CW(5) closes circuits for lighting a calls waiting lamp at each position which serves the trunk group, by connecting ground to conductors 519 and 520 thereby lighting lamps CW(14) and CW(17) as well as the corresponding lamp of all other positions serving the first preference.

In addition relay CW(5) connects ground to conductor 521 which is effective, if none of the operators' positions is occupied and the night alarm key NA(7) is operated, to complete a circuit over a normally closed contact in each pair of position jacks to conductor 1411, contact of key NA(7) to battery through the winding of relay NA(7) which operates night bell 713 to inform the operator that a call is waiting at this service desk.

The operator then plugs into one of the positions marked by a lighted lamp, whereupon the night alarm bell is silenced and the preference circuit functions to connect the calling trunk to that position in the usual manner.

As soon as relay PS(9) operates, relay CW(5) releases and extinguishes all of the calls waiting lamps.

*Timing and alarms*

In view of the fixed order of the preferences, several different arrangements are provided to prevent holding other preference circuits out of service in cases of trouble with one preference circuit.

Each time that a preference circuit functions, relay GT(7) is operated as previously described. When relay GT(7) operates it connects ground to conductor 709 and battery to conductor 710. With battery connected to conductor 710, a circuit is closed from conductor 710 through resistance T1(7), winding and contact 2 of relay WT(7) to ground when interrupter CS(7) closes its contact. Relay WT(7) operates and locks over its contact 3 to ground on conductor 709. At the same time relay WT(7) closes a circuit from battery on conductor 710, resistance T2(7), winding of relay ZT(7), contact 3 of relay WT(7) to ground on conductor 709, but relay ZT(7) cannot operate, being shunted by ground over the contacts of interrupter CS(7), which is connected over contact 1 of relay ZT(7) to resistance T2(7) in shunt of the winding of relay ZT(7). When the interrupter opens its contacts, relay ZT(7) operates.

At the next closure of the interrupter contact, ground is connected over contact 2 of relay ZT(7) to resistance T1(7) in shunt of the winding of relay WT(7) causing that relay to release. Relay ZT(7) is held operated over contact 2 of relay WT(7) and the interrupter contact until that contact opens. These relays are now ready for another cycle.

When relay ZT(7) operates for the first time, it closes a circuit from battery on conductor 710, contact 5 of relay ZT(7), winding of relay A(7), contact 3 of relay ZT(7) to ground on conductor 709. Relay A(7) operates and locks over its contacts 3 and 4 to conductors 710 and 709.

When both relays WT(7) and ZT(7) have released at the end of the cycle, a circuit is closed from battery on conductor 710, contact 6 of relay ZT(7), contact 2 of relay A(7), contact 5 of relay WT(7), conductor 711, winding of alarm relay AL(8), conductor 805, contact 4 of relay WT(7), contact 1 of relay A(7), contact 4 of relay ZT(7) to ground on conductor 709.

The period of interrupter CS(7) is such that relay AL(8) operates from 1 to 2 seconds after the operation of relay GT(7). Under normal conditions, relay GT(7) releases before relay AL(7) operates and restores relays WP(7), ZP(7) and A(7) to normal.

If relay GT(7) fails to release, so that relay AL(8) operates, relay AL(8) closes a locking circuit for itself under the control of relay GT(7) from ground on conductor 709, contact 6, winding and contact 7 of relay AL(8) to battery on conductor 710. Relay AL(8) also closes a circuit from ground over its contact 5 to battery through register R(8) to register a recycle. In addition relay AL(8) closes a circuit from battery over its contact 10, left winding of relay ARL(8) to ground at contact 4 of relay AL(8) and a second circuit from battery over its contact 9 through the right winding of the relay ARL(8) to ground at contact 2 of relay AL(8).

Relay ARL(8) operates in these circuits, opening the operating and locking circuits for relays SPGS(7), SSGS(7), PGS(9), SGS(9), and the corresponding relays in the other preferences, thereby causing the operated ones of these relays to release and open the circuits of relay GT(7). Relay ARL(8) also releases the select magnet if one has been operated.

Relay AL(8) also closes a circuit from battery through resistance A1(8), winding and contact 2 of relay WA(8), to ground at contact 2 of relay AL(8). Relay WA(8) operates and locks over its contact 3 to ground at contact 5 of relay RL(8), closing a circuit from its locking ground through the winding of relay ZA(8) and resistance A2(8) to battery. Relay ZA(8) does not operate, being shunted by ground from contact 2 of relay AL(8) over its contact 1.

When relay GT(7) releases, relays WT(7), ZT(7), A(7), AL(8) and ALR(8) release and relay ZA(8) operates. Relay AL(8) is slow to release to assure that the circuits are ready for the next preference selection before releasing relay ALR(8) to restore the preference circuits and permit other calls to be handled.

If the next call goes through properly the operation of release relay RL(8) will release relays WA(8) and ZA(8).

If the trouble lies in the trunk circuit, the alternate serving of the highest numbered trunk and the lowest numbered trunk will permit alternate operations of the preference circuit to be successful until all of the trunks waiting in that preference have been served except the trunk in trouble which will finally be both the highest numbered trunk and the lowest numbered trunk waiting to be served. In this case two successive attempts to complete the call will fail.

If relay AL(8) reoperates with relays WA(8) and ZA(8) operated, a circuit is closed from ground at contact 2 of relay AL(8) over contact 2 of relay ZA(8) to resistance A1(8) in shunt of the winding of relay WA(8) causing relay WA(8) to release. Relay ZA(8) is held operated over contact 2 of relay WA(8) and contact 2 of relay AL(8).

Assuming that the preference circuit of Figs. 9 and 10 is the preference in trouble, relay PGS(9) and SGS(9) are operated. When these relays are normal, relay GB(10) is held operated over its contact 4, conductor 1014 to ground over contacts 10 of relays PGS(9) and SGS(9). When relay PGS(9) operates it connects conductor 1014 over its contact 11 to conductors 925 and 825 and when relay SGS(9) operates it connects conductor 1014 over its contact 11 to conductors 926 and 826. Conductors 825 and 826 are normally grounded at contacts 4 and 5 of relay ZA(8). When relay WA(8) operates and relay AL(8) releases, conductors 825 and 826 are connected over contacts 1 and 4 of relay WA(8) to ground at contacts 1 and 3 of relay AL(8). When relay AL(8) operates for the second time, while relay ZA(8) is held operated, ground is removed from conductors 825 and 826 and relay GB(10) releases, opening the circuits of relays PS(9), PGS(9) and SGS(9) so that this preference circuit cannot function, but calls in other preference groups may go through.

Relay GB(10), in releasing, lights lamp GB(10) and connects battery to conductor 1015 and ground to conductors 1016 and 1017 and over these conductors to conductors 715, 716 and 717 to operate the alarm 712. In addition, relay GB(10) removes battery from conductor 509 so that gate relay G(5) of the trunk preference circuit cannot operate. No calls can be handled in this preference but calls in other preferences will be handled in the usual manner.

The service assistant's preference circuit is provided with a similar blocking relay GBS(7) to prevent transfer of calls to that position in case of trouble thereat.

After the trouble has been noted, the preference may be restored to service by operating key AR(7) thereby operating relay GBR(7) which closes operating circuits for all of the blocking relays thereby operating relay GB(10) which locks under the control of relays PGS(9) and SGS(9) and restores the circuit for gate relay G(5).

A plurality of lamps are shown, circuits for which are prepared as different relays operate but which are not normally lighted. When an alarm is sounded by the operation of alarm circuit 712, key TL(7) may be operated, in turn operating relay TL(7) to supply ground for lighting the lamps whose circuits have been prepared, thereby enabling the attendant to identify the location of the trouble. Having located the source of the trouble, key MJ-CO(7) may be operated to silence the alarm.

To further assist in identifying circuit troubles a number of checking relays are provided. These relays may be identified as relays CRL(8), CGT1(8), CGT2(8), CSS(7), and one relay for each preference circuit including relays CPS(10) and CPS(12).

The windings of relay CPS(10), for example, are connected in parallel with the two windings of relay PS(9). As previously described, when the two circuits previously traced for relay PS(9) are closed, both windings of relay CPS(10) are energized, but due to their differential arrangement relay CPS(10) does not operate. Relay PS(9) will operate and perform its regular functions on one winding if one of its circuits is broken, but in this case relay CPS(10) operates, in turn operating relay LPS(10) which locks under the control of key LR(8) and lights lamp LPS(10) to indicate the faulty circuit.

Relay CSS(7) performs a similar function for the service assistant's preference circuit, while relay CRL(8) similarly guards the circuits of relay RL(8).

Relays CGT1(8) and CGT2(8) are operated in series with the two windings of relay GT(7), holding relay LGT(8) operated when either both are operated or both are released, relay LGT(8) being slow to release to cover the operate or release time of the two relays. If only one relay operates or releases, relay LGT(8) releases, lights lamp LGT(8) and closes a shunt around its own winding under the control of key LR(8).

This double winding arrangement permits the preference circuits to continue to function, while the check relays indicate wiring troubles which may be repaired before they cause a serious circuit failure.

What is claimed is:

1. In a telephone system including a plurality of trunk circuits arranged in sequence, a plurality of operator positions and switches for connecting said trunk circuits with said operator positions, an allotter for controlling said switches, means responsive to the seizure of one or more of said trunk circuits to initiate the operation of said allotter, means in said allotter to select the seized trunk circuit nearest the beginning of the sequence, means in said allotter to select the seized trunk circuit nearest the end of the sequence, means operated during each operation of said allotter to render said selecting means alternately effective, and means responsive to the selection of a seized trunk circuit to operate one of said switches to connect the selected trunk circuit with one of said operator positions.

2. In a telephone system including a plurality of trunk circuits arranged in sequence, a plurality of operator positions arranged in sequence and switches for connecting said trunk circuits with said operator positions, means to mark said positions available, an allotter for controlling said switches, means responsive to the seizure of one or more of said trunk circuits to initiate the operation of said allotter, means in said allotter to select the seized trunk circuit nearest the beginning of the sequence and the available position nearest the beginning of the sequence, means in said allotter to select the seized trunk circuit nearest the end of the sequence and the available position nearest the end of the sequence, means operated during each operation of said allotter to render said selecting means alternately effective, and means responsive to the selection of a seized trunk circuit to operate one of said switches to connect the selected trunk circuit with the selected operator position.

3. In a telephone system including a plurality of trunks, a plurality of operator positions and a switch for connecting any one of said trunks with any one of said operator positions, a control circuit common to said trunks and to said operator positions for operating said switch, means at each of said positions to mark said position idle, other means at each of said positions to mark said positions available, a seizing circuit for said control circuit means operated under the control of one of said trunks to prepare said seizing circuit, means under the control of the idle marking means at each position to complete said seizing circuit, a start circuit for said control circuit, means operated responsive to the completion of said seizing circuit to prepare said start circuit, means under the control of the available marking means at each position to complete said start circuit, and means operated responsive to the completion of said start circuit for operating said switch to connect said calling trunk with one of said available positions.

4. In a telephone system including a plurality of trunks, a plurality of operator positions and a switch for connecting any one of said trunks with any one of said operator positions, a control circuit common to said trunks and to said operator positions for operating said switch, means at each of said positions to mark said position idle, other means at each of said positions to mark said position available, a seizing circuit for said control circuit means operated under the control of one of said trunks to prepare said seizing circuit, means under the control of the idle marking means at each position to complete said seizing circuit, a start circuit for said control circuit, means operated responsive to the completion of said seizing circuit to prepare said start circuit, means under the control of the available marking means at each position to complete said start circuit, means operated responsive to the completion of said start circuit for operating said switch to connect said calling trunk with one of said available positions, means operated responsive to the connection of said trunk with said one position to disable said idle marking means and said available remarking means at said one position, means responsive to the disconnection of said trunk from said position to restore said idle marking means, and means operated responsive to the completion of said seizing circuit when all of said available marking means are disabled to reenable the available marking means at those positions at which said idle marking means has been restored.

5. In a telephone system including a plurality of groups of trunk circuits, a plurality of operator positions and switches for connecting said trunk circuits with said operator positions, a control circuit for said switches individual to each group of trunks and operable through a cycle to operate a switch to connect one trunk with one operator position, means common to said control circuits to render only one control circuit operative at a time, timing means in said common means, means operated by said control circuit at the start of each cycle to initiate the operation of said timing means, normal release means in said common means operated by said control circuit at the completion of a cycle to release the operative control circuit, to permit the same or another control circuit to start a cycle and to release said timing means, auxiliary releasing means responsive to the complete operation of said timing means to release the operative control circuit and said timing means, to indicate the operation of said timing means and to initiate a new cycle, means operated by said normal release means at the end of said new cycle to cancel said indication, and means operated by said auxiliary release means responsive to the complete operation of said timing means during said new cycle to disable the operative control circuit.

6. In a telephone system including a plurality of groups of trunks, a plurality of operator positions and switches for connecting said trunks with said operator positions, a control circuit for said switches individual to each of said groups of trunks, circuit connections between said control circuits and said operator positions to assign said operator positions to serve said control circuits, idle marking means at each operator position, available marking means at each operator position, a seizing relay for each control circuit, means under the control of a calling trunk to prepare the circuit for the seizing relay of the control circuit individual to the group of trunks including said calling trunk, means under the control of the idle indicating means at each position assigned to said individual control circuit to complete the circuit of said seizing relay, a chain start circuit controlled by the seizing relays of said control circuits to arrange said control circuits in a definite order of preference, a start relay for each control circuit, means responsive to the operation of said seizing relay to extend said chain start circuit to the start relay of said control circuit, means under the control of said available marking means at each position assigned to serve said control circuit to complete said chain start circuit to operate said start relay, and means responsive to the operation of said start relay to cause said control circuit to operate one of said switches to connect said calling trunk with one of said available operator positions.

7. In a telephone system including a plurality of groups of trunks, a plurality of operator positions and switches for connecting said trunks with said operator positions, a control circuit for said switches individual to each of said groups of trunks, circuit connections between said control circuits and said operator positions to assign said operator positions to serve said control circuits, idle marking means at each operator position, available marking means at each operator position, a seizing relay for each control circuit, means under the control of a calling trunk to prepare the circuit for the seizing relay of the control circuit individual to the group of trunks including said calling trunk, means under the control of the idle indicating means at each position assigned to said individual control circuit to complete the circuit of said seizing relay, a chain start circuit controlled by the seizing relays of said control circuits to arrange said control circuits in a definite order of preference, a start relay for each control circuit, means responsive to the operation of said seizing relay to extend said chain start circuit to the start relay of said control circuit, means under the control of said available marking means at each position assigned to serve said control circuit to complete said chain start circuit to operate said start relay, means responsive to the operation of said start relay to cause said control circuit to operate one of said switches to connect said calling trunk with one of said available operator positions, timing means common to said control circuits, means responsive to the operation of any one of said start relays to start the operation of said timing means, normal release means responsive to the connection of a calling trunk with an operator position to release the operated start relay and stop said timing means, other release means responsive to the complete operation of said timing means to release said operated start relay, and means responsive to two complete operations of said timing means to prevent the subsequent operation of the seizing relay or the start relay of the control circuit causing the two operations of said timing means.

8. In a telephone system including a plurality of groups of trunks, a plurality of operator positions and switches for connecting said trunks with said operator positions, a control circuit for said switches individual to each of said groups of trunks, circuit connections between said control circuits and said operator positions to assign said operator positions to serve said control circuits, idle marking means at each operator position, available marking means at each operator position, a seizing relay for each control circuit, means under the control of a calling trunk to prepare the circuit for the seizing relay of the control circuit individual to the group of trunks including said calling trunk, means under the control of the idle indicating means at each position assigned to said individual control circuit to complete the circuit of said seizing relay, a chain start circuit controlled by the seizing relays of said control circuits to arrange said control circuits in a definite order of preference, a start relay for each control circuit, means responsive to the operation of said seizing relay to extend said chain start circuit to the start relay of said control circuit, means under the control of said available marking means at each position assigned to serve said control circuit to complete said chain start circuit to operate said start relay, means responsive to the operation of said start relay to cause said control circuit to operate one of said switches to connect said calling trunk with one of said available operator positions, timing means common to said control circuits, means responsive to the operation of any one of said start relays to start the operation of said timing means, normal release means responsive to the connection of a calling trunk with an operator position to release the operated start relay and stop said timing means, other release means responsive to the complete operation of said timing means to release said operated start relay, to register the complete operation of said timing means and release said timing means, and means responsive to two complete operations of said timing means to prevent the subsequent operation of the seizing relay or the start relay of the control circuit causing the second complete operation of said timing means.

9. In a telephone system including a plurality of trunk circuits arranged in sequence, a plurality of operator positions and switches for connecting said trunk circuits with said operator positions, an allotter for controlling said switches, means responsive to the seizure of one or more of said trunk circuits to initiate the operation of said allotter, a first chain circuit effective to select the seized trunk circuit nearest the beginning of the sequence, a second chain circuit effective to select the seized trunk circuit nearest the end of the sequence, means in said allotter to alternately energize said first chain circuit and said second chain circuit, and means controlled by the energized one of said chain circuits to operate one of said switches to connect the selected trunk circuit with one of said operator positions.

10. In a telephone system including a plurality of trunk circuits arranged in sequence, a plurality of operator positions and switches for connecting said trunk circuits with said operator positions, an allotter for controlling said switches, means responsive to the seizure of one or more of said trunk circuits to initiate the operation of said allotter, a first chain circuit effective to select the seized trunk circuit nearest the beginning of the sequence, a second chain circuit effective to select the seized trunk circuit nearest the end of the sequence, means in said allotter operated to mark alternate operations thereof, means under the control of said marking means to alternately energize said first chain circuit and said second chain circuit, and means under the control of the energized one of said chain circuits to operate one of said switches to connect the selected trunk circuit with one of said operator positions.

11. In a telephone system including a plurality of trunk circuits arranged in sequence, a plurality of operator positions arranged in sequence and switches for connecting said trunk circuits with said operator positions, an allotter for controlling said switches, means responsive to the seizure of one or more of said trunk circuits to initiate the operation of said allotter, means to mark said positions available to said allotter, a first chain circuit effective to select the seized trunk circuit nearest the beginning of the sequence, a second chain circuit effective to select the available position nearest the beginning of the sequence, a third chain circuit effective to select the seized trunk circuit nearest the end of the sequence, a fourth chain circuit effective to select the available position nearest the end of the sequence, means in said allotter alternately effective to energize said first and second chain circuits and to energize said third and fourth chain circuits, and means under the control of the energized chain circuits to operate one of said switches to connect the selected trunk circuit with the selected operator position.

12. In a telephone system including a plurality of trunk circuits arranged in sequence, a plurality of operator positions arranged in sequence and switches for connecting said trunk circuits with said operator positions, an allotter for controlling said switches, means responsive to the seizure of one or more of said trunk circuits to initiate the operation of said allotter, means to mark said positions available to said allotter, a first chain circuit effective to select the seized trunk circuit nearest the beginning of the sequence, a second chain circuit effective to select the available position nearest the beginning of the sequence, a third chain circuit effective to select the seized trunk circuit nearest the end of the sequence, a fourth chain circuit effective to select the available position nearest the end of the sequence, means in said allotter operated to mark alternate operations thereof, means effective under the control of said marking means to energize said first and second chain circuits or to energize said third and fourth chain circuits, and means under the control of the energized chain circuits to operate one of said switches to connect the selected trunk circuit with the selected operator position.

13. In a telephone system including a plurality of trunk circuits arranged in sequence, a plurality of operator positions and a plurality of switches, an allotter for controlling said switches to connect said trunk circuits with said operator positions, means whereby the seizure of one or more of said trunk circuits initiates the operation of said allotter, first means in said allotter to select the seized trunk circuit nearest the beginning of the sequence, second means in said allotter to select the seized trunk circuit nearest the end of the sequence, discriminating means for alternately rendering said first selecting means and said second selecting means effective, and means whereby each operation of said allotter operates said discriminating means.

14. In a telephone system including a plurality of trunks, a plurality of operator positions and a switch for connecting any one of said trunks with any one of said operator positions, a control circuit common to said trunks and to said operator positions for operating said switch, means at each of said positions to mark said position idle, other means at each of said positions to mark said position available, a seizing circuit for said control circuit, means whereby one of said trunks prepares said seizing circuit, means whereby the idle marking means at each position completes said seizing circuit, a start circuit for said control circuit, means whereby the completion of said seizing circuit prepares said start circuit, means whereby the available marking means at each position completes said start circuit, and means whereby the completion of said start circuit causes said control circuit to operate said switch to connect said one trunk with one of said available positions.

15. In a telephone system including a plurality of groups of trunk circuits, a plurality of operator positions and switches for connecting said trunk circuits with said operator positions, a control circuit for said switches individual to each group of trunks and operable through a cycle to operate a switch to connect one trunk with one operator position, means common to said control circuits, means whereby said common means renders only one of said control circuits operative at a time, timing means in said common means, means whereby the start of each cycle by the operative control circuit initiates the operation of said timing means, normal release means in said common means, means whereby the completion of a cycle by said operative control means operates said normal release means, means whereby said normal release means releases the operative control circuit, permits the same or another control circuit to start a cycle and releases said timing means, auxiliary release means, means whereby the complete operation of said timing means operates said auxiliary release means, means for recording the operation of said timing means, means whereby said auxiliary release means releases the operative control circuit, releases said timing means, operates said recording means and initiates a new cycle, means whereby if said normal release means is operated at the end of said new cycle, said normal release means releases said recording means, means to disable said operative control circuit, and means whereby if said auxiliary release means is operated by said timing means during said new cycle, said auxiliary release means operates said disabling means.

References Cited in the file of this patent

UNITED STATES PATENTS

| Number | Name | Date |
|---|---|---|
| 1,337,681 | Williams | Apr. 20, 1920 |
| 1,861,754 | Powell | June 7, 1932 |
| 2,059,596 | Meszar | Nov. 3, 1936 |
| 2,249,486 | Molnar | July 15, 1941 |
| 2,361,313 | Molnar | Oct. 24, 1944 |
| 2,467,457 | Balzer | Apr. 19, 1949 |